United States Patent
Wehrmann

(10) Patent No.: US 9,598,216 B2
(45) Date of Patent: *Mar. 21, 2017

(54) WEB AND METHOD FOR MAKING FLUID FILLED UNITS

(71) Applicant: Automated Packaging Systems, Inc., Streetsboro, OH (US)

(72) Inventor: Rick Steven Wehrmann, Hudson, OH (US)

(73) Assignee: Automated Packaging Systems, Inc., Streetsboro, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/934,594

(22) Filed: Nov. 6, 2015

(65) Prior Publication Data

US 2016/0122113 A1    May 5, 2016

Related U.S. Application Data

(62) Division of application No. 12/394,781, filed on Feb. 27, 2009, now Pat. No. 9,205,622.

(51) Int. Cl.
*B65D 81/05*    (2006.01)
*B65D 81/02*    (2006.01)
(Continued)

(52) U.S. Cl.
CPC ......... *B65D 81/052* (2013.01); *B31D 5/0073* (2013.01); *B32B 1/08* (2013.01);
(Continued)

(58) Field of Classification Search
CPC .... B31D 5/0073; B65D 81/02; B65D 81/051; B32B 1/02; B32B 1/08; Y10T 428/1352; Y10T 428/139; Y10T 428/1393
(Continued)

(56) References Cited

U.S. PATENT DOCUMENTS 2,153,214 A    4/1939    Tondrean
2,379,935 A    7/1945    Seiferth et al.
(Continued)

FOREIGN PATENT DOCUMENTS

CA    2428246    9/2002
EP    1466720    10/2004
(Continued)

OTHER PUBLICATIONS

Office Action from U.S. Appl. No. 13/036,170 dated Jan. 11, 2016.
(Continued)

*Primary Examiner* — Walter B Aughenbaugh
(74) *Attorney, Agent, or Firm* — Calfee, Halter & Griswold LLP

(57) ABSTRACT

A web, method, and apparatus for forming dunnage units. The web includes first and second elongated layers. A plurality of seals that hermetically join the first elongated layer to the second elongated layer to form a plurality of inflatable pouches and an inflation channel that is in fluid communication with pouches and is disposed outside of the pouches. An inflation side line of perforations, a gap forming area, and an opposite side line of perforations are arranged in a line between pair(s) of the pouches.

12 Claims, 17 Drawing Sheets

(51) Int. Cl.
*B31D 5/00* (2006.01)
*B32B 1/08* (2006.01)
*B32B 3/26* (2006.01)
*B32B 7/06* (2006.01)
*B32B 1/02* (2006.01)

(52) U.S. Cl.
CPC ............... *B32B 3/266* (2013.01); *B32B 7/06* (2013.01); *B65D 81/02* (2013.01); *B65D 81/051* (2013.01); *B31D 2205/0052* (2013.01); *B31D 2205/0058* (2013.01); *B32B 1/02* (2013.01); *B32B 2250/02* (2013.01); *B32B 2307/7242* (2013.01); *B32B 2553/023* (2013.01); *Y10T 428/139* (2015.01); *Y10T 428/1334* (2015.01); *Y10T 428/1352* (2015.01); *Y10T 428/1393* (2015.01)

(58) Field of Classification Search
IPC .......................................... B65D 81/02,81/051
See application file for complete search history.

(56) References Cited

U.S. PATENT DOCUMENTS

| | | |
|---|---|---|
| 3,033,257 A | 5/1962 | Weber |
| 3,254,820 A | 6/1966 | Lerner |
| 3,254,828 A | 6/1966 | Lerner |
| 3,298,156 A | 1/1967 | Lerner |
| 3,358,823 A | 12/1967 | Paxton |
| 3,359,703 A | 12/1967 | Quaadgras |
| 3,389,534 A | 6/1968 | Pendelton |
| 3,414,140 A | 12/1968 | Feldkamp |
| 3,456,867 A | 7/1969 | Repko |
| 3,462,027 A | 8/1969 | Puckhaber |
| 3,477,196 A | 11/1969 | Lerner |
| 3,523,055 A | 8/1970 | Lemelson |
| 3,559,874 A | 2/1971 | Titchenal |
| 3,575,757 A | 4/1971 | Smith |
| 3,575,781 A | 4/1971 | Pezely |
| 3,577,305 A | 5/1971 | Hines et al. |
| 3,616,155 A | 10/1971 | Chavannes |
| 3,618,286 A | 11/1971 | Membrino |
| 3,650,877 A | 3/1972 | Johnson |
| 3,660,189 A | 5/1972 | Troy |
| 3,667,593 A | 6/1972 | Pendleton |
| 3,699,746 A | 10/1972 | Titchenal |
| 3,730,240 A | 5/1973 | Presnick |
| 3,744,211 A | 7/1973 | Titchenal |
| 3,791,573 A | 2/1974 | Armstrong |
| 3,795,163 A | 3/1974 | Armstrong et al. |
| 3,802,974 A | 4/1974 | Emmel |
| 3,808,981 A | 5/1974 | Shaw |
| 3,813,845 A | 6/1974 | Weikert |
| 3,817,803 A | 6/1974 | Horsley |
| 3,837,990 A | 9/1974 | Huffaker et al. |
| 3,837,991 A | 9/1974 | Evans et al. |
| 3,855,037 A | 12/1974 | Imhagen et al. |
| 3,938,298 A | 2/1976 | Luhman et al. |
| 3,939,995 A | 2/1976 | Baxter |
| 3,941,306 A | 3/1976 | Weikert |
| 4,014,154 A | 3/1977 | Lerner |
| 4,017,351 A | 4/1977 | Larson |
| 4,021,283 A | 5/1977 | Weikert |
| 4,040,526 A | 8/1977 | Baxter |
| 4,044,693 A | 8/1977 | Ramsey, Jr. |
| 4,076,872 A | 2/1978 | Lewicki et al. |
| 4,096,306 A | 6/1978 | Larson |
| 4,102,364 A | 7/1978 | Leslie |
| 4,103,471 A | 8/1978 | Lowdermilk |
| 4,146,069 A | 3/1979 | Angarola et al. |
| 4,169,002 A | 9/1979 | Larson |
| 4,201,029 A | 5/1980 | Lerner |
| 4,245,796 A | 1/1981 | Eglinton |
| 4,306,656 A | 12/1981 | Dahlem |
| 4,314,865 A | 2/1982 | Ottaviano |
| 4,354,004 A | 10/1982 | Hughes et al. |
| 4,380,484 A | 4/1983 | Repik et al. |
| 4,493,684 A | 1/1985 | Bolton |
| 4,518,654 A | 5/1985 | Eichbauer et al. |
| 4,545,180 A | 10/1985 | Chung et al. |
| 4,564,407 A | 1/1986 | Tsuruta |
| 4,576,669 A | 3/1986 | Caputo |
| 4,597,244 A | 7/1986 | Pharo |
| 4,616,472 A | 10/1986 | Owensby et al. |
| 4,619,635 A | 10/1986 | Ottaviano |
| 4,631,901 A | 12/1986 | Chung et al. |
| 4,664,577 A | 5/1987 | Bonali |
| 4,676,376 A | 6/1987 | Kerswetter |
| 4,787,755 A | 11/1988 | Branson |
| 4,793,123 A | 12/1988 | Pharo |
| 4,847,126 A | 7/1989 | Hiroshi et al. |
| 4,874,093 A | 10/1989 | Pharo |
| 4,901,506 A | 2/1990 | Weyandt |
| 4,904,092 A | 2/1990 | Campbell et al. |
| 4,918,904 A | 4/1990 | Pharo |
| 4,922,687 A | 5/1990 | Chow et al. |
| 4,931,033 A | 6/1990 | Leeds |
| 4,945,714 A | 8/1990 | Bodolay et al. |
| 4,981,374 A | 1/1991 | Rutter et al. |
| 5,034,450 A | 7/1991 | Betz |
| 5,041,317 A | 8/1991 | Greyvenstein |
| 5,064,408 A | 11/1991 | Bridgeman |
| 5,070,675 A | 12/1991 | Chuan-Shiang |
| 5,094,657 A | 3/1992 | Dworak et al. |
| 5,117,608 A | 6/1992 | Nease et al. |
| 5,141,494 A | 8/1992 | Danforth et al. |
| 5,181,614 A | 1/1993 | Watts |
| 5,187,917 A | 2/1993 | Mykleby |
| 5,188,691 A | 2/1993 | Caputo |
| 5,203,761 A | 4/1993 | Reichental et al. |
| 5,210,993 A | 5/1993 | van Boxtel |
| 5,216,868 A | 6/1993 | Cooper et al. |
| 5,257,492 A | 11/1993 | Watts |
| 5,272,856 A | 12/1993 | Pharo |
| 5,289,671 A | 3/1994 | Lerner |
| 5,307,969 A | 5/1994 | Menendez |
| 5,340,632 A | 8/1994 | Chappuis |
| 5,351,828 A | 10/1994 | Becker et al. |
| 5,383,837 A | 1/1995 | Watts |
| 5,394,676 A | 3/1995 | Lerner |
| 5,427,294 A | 6/1995 | VandenHeuvel |
| 5,454,642 A | 10/1995 | DeLuca |
| 5,468,525 A | 11/1995 | Watts |
| 5,470,300 A | 11/1995 | Terranova |
| 5,552,003 A | 9/1996 | Hoover et al. |
| 5,651,237 A | 7/1997 | DeLuca |
| 5,693,163 A | 12/1997 | Hoover et al. |
| 5,699,653 A | 12/1997 | Hartman et al. |
| 5,722,218 A | 3/1998 | Lerner |
| 5,733,045 A | 3/1998 | Jostler et al. |
| 5,752,666 A | 5/1998 | Simhaee |
| 5,755,328 A | 5/1998 | DeLuca |
| 5,810,200 A | 9/1998 | Trokhan |
| 5,824,392 A | 10/1998 | Gotoh et al. |
| 5,826,723 A | 10/1998 | Jaszai |
| 5,921,390 A | 7/1999 | Simhaee |
| 5,944,424 A | 8/1999 | Lerner et al. |
| 5,987,856 A | 11/1999 | Lerner |
| 5,996,319 A | 12/1999 | Lerner et al. |
| RE36,501 E | 1/2000 | Hoover et al. |
| 6,015,047 A | 1/2000 | Greenland |
| 6,015,357 A | 1/2000 | Rizza |
| 6,055,796 A | 5/2000 | Lerner et al. |
| RE36,759 E | 7/2000 | Hoover et al. |
| 6,116,000 A | 9/2000 | Perkins et al. |
| 6,170,239 B1 | 1/2001 | Lerner |
| 6,199,349 B1 | 3/2001 | Lerner |
| 6,206,262 B1 | 3/2001 | Achelpohl |
| 6,209,286 B1 | 4/2001 | Perkins et al. |
| 6,213,167 B1 | 4/2001 | Greenland |
| 6,228,454 B1 | 5/2001 | Johnson et al. |
| 6,282,716 B1 | 9/2001 | Patterson et al. |
| 6,367,975 B1 | 4/2002 | Cronauer et al. |
| 6,410,119 B1 | 6/2002 | DeLuca et al. |

(56) References Cited

U.S. PATENT DOCUMENTS

| | | |
|---|---|---|
| 6,423,166 B1 | 7/2002 | Simhaee |
| 6,447,864 B2 | 9/2002 | Johnson et al. |
| 6,460,313 B1 | 10/2002 | Cooper |
| 6,488,222 B1 | 12/2002 | West et al. |
| 6,499,278 B2 | 12/2002 | Cronauer et al. |
| 6,519,916 B1 | 2/2003 | Brown |
| 6,527,147 B2 | 3/2003 | Wehrmann |
| 6,536,624 B2 | 3/2003 | Johnson et al. |
| 6,543,201 B2 | 4/2003 | Cronauer et al. |
| 6,550,229 B2 | 4/2003 | Sperry et al. |
| 6,565,946 B2 | 5/2003 | Perkins et al. |
| 6,582,800 B2 | 6/2003 | Fuss et al. |
| 6,609,644 B1 | 8/2003 | Menna |
| 6,625,956 B1 | 9/2003 | Soudan |
| D480,646 S | 10/2003 | Borchard et al. |
| D480,971 S | 10/2003 | DeLuca et al. |
| 6,635,145 B2 | 10/2003 | Cooper |
| 6,651,406 B2 | 11/2003 | Sperry et al. |
| 6,659,150 B1 | 12/2003 | Perkins et al. |
| 6,672,037 B2 | 1/2004 | Wehrmann |
| 6,696,127 B1 | 2/2004 | Mitchell, Jr. |
| D490,711 S | 6/2004 | DeLuca et al. |
| 6,742,317 B2 | 6/2004 | Cronauer et al. |
| 6,751,926 B1 | 6/2004 | Cooper |
| 6,761,960 B2 | 7/2004 | DeLuca et al. |
| 6,786,022 B2 | 9/2004 | Fuss et al. |
| 6,871,755 B2 | 3/2005 | DeVries |
| 6,889,739 B2 | 5/2005 | Lerner et al. |
| 6,946,044 B2 | 9/2005 | Lörsch |
| 6,948,296 B1 | 9/2005 | Lerner et al. |
| 6,952,910 B1 | 10/2005 | Lörsch |
| 6,955,846 B2 | 10/2005 | Lerner |
| D512,311 S | 12/2005 | DeLuca et al. |
| D513,182 S | 12/2005 | DeLuca et al. |
| 7,032,774 B2 | 4/2006 | Boehm |
| 7,059,794 B2 | 6/2006 | Weeks |
| 7,125,463 B2 | 10/2006 | Lerner et al. |
| 7,165,375 B2 | 1/2007 | O'Dowd |
| 7,223,462 B2 | 5/2007 | Perkins et al. |
| 7,297,387 B2 | 11/2007 | Koyanagi |
| 7,331,542 B2 | 2/2008 | Coffiadiferro et al. |
| 7,467,738 B2 | 12/2008 | Woods |
| 7,513,090 B2 | 4/2009 | Wehrmann |
| 7,533,772 B2 | 5/2009 | Yoshifusa et al. |
| 7,540,125 B2 | 6/2009 | Lindquist |
| 7,550,191 B2 | 6/2009 | Lerner |
| 7,552,571 B2 | 6/2009 | Lerner et al. |
| D596,031 S | 7/2009 | Wehrmann |
| 7,571,584 B2 | 8/2009 | Lerner |
| 7,578,333 B2 | 8/2009 | Greenwood et al. |
| D599,118 S | 9/2009 | Perkins et al. |
| 7,603,830 B2 | 10/2009 | Nowakowski |
| 7,607,911 B2 | 10/2009 | Sperry et al. |
| D603,705 S | 11/2009 | Wehrmann |
| 7,665,394 B2 | 2/2010 | Roberts |
| 7,694,495 B2 | 4/2010 | Wehrmann |
| 7,718,028 B2 | 5/2010 | Lerner et al. |
| 7,757,459 B2 | 7/2010 | Wehrmann |
| 7,767,288 B2 | 8/2010 | Lerner |
| D630,945 S | 1/2011 | Wehrmann |
| D633,792 S | 3/2011 | Wehrmann |
| 7,897,219 B2 | 3/2011 | Wehrmann |
| 7,897,220 B2 | 3/2011 | Wehrmann |
| 7,950,433 B2 | 5/2011 | Sperry et al. |
| 7,975,457 B2 | 7/2011 | Wehrmann |
| D646,972 S | 10/2011 | Wehrmann |
| 8,038,348 B2 | 10/2011 | Lerner |
| 8,128,770 B2 | 3/2012 | Wetsch et al. |
| 8,307,617 B2 | 11/2012 | Riccardi et al. |
| 8,354,150 B2 | 1/2013 | Whermann et al. |
| 8,357,439 B2 | 1/2013 | Wehrmann |
| 8,425,994 B2 | 4/2013 | Wehrmann |
| 9,205,622 B2 * | 12/2015 | Wehrmann ........... B31D 5/0073 |
| 9,266,300 B2 | 2/2016 | Chuba |
| 9,283,729 B2 | 3/2016 | Wehrmann et al. |
| 2001/0000719 A1 | 5/2001 | Lerner |
| 2001/0013215 A1 * | 8/2001 | Fuss ................... B31D 5/0073 53/403 |
| 2001/0014980 A1 | 8/2001 | Patterson et al. |
| 2002/0108697 A1 | 8/2002 | Perkins et al. |
| 2002/0150730 A1 | 10/2002 | DeLuca et al. |
| 2002/0155246 A1 | 10/2002 | Johnson et al. |
| 2002/0174629 A1 | 11/2002 | Cronauer et al. |
| 2003/0089082 A1 | 5/2003 | Fuss et al. |
| 2003/0094395 A1 | 5/2003 | Peper et al. |
| 2003/0109369 A1 | 6/2003 | Lerner et al. |
| 2004/0000581 A1 | 1/2004 | Brandolini et al. |
| 2004/0265523 A1 | 12/2004 | Koyanagi et al. |
| 2005/0221059 A1 | 10/2005 | Matarasso |
| 2005/0266189 A1 | 12/2005 | Wehrmann |
| 2006/0042191 A1 | 3/2006 | Lerner |
| 2006/0086064 A1 | 4/2006 | Wehrmann |
| 2006/0090421 A1 | 5/2006 | Sperry |
| 2006/0218879 A1 | 10/2006 | Garceau et al. |
| 2006/0262997 A1 | 11/2006 | Hershey et al. |
| 2007/0054074 A1 | 3/2007 | Wehrmann |
| 2007/0054075 A1 | 3/2007 | Wehrmann |
| 2007/0100076 A1 | 5/2007 | Hayes |
| 2008/0022630 A1 | 1/2008 | Fuss et al. |
| 2008/0066852 A1 | 3/2008 | Wetsch et al. |
| 2009/0110864 A1 | 4/2009 | Wehrmann |
| 2009/0293427 A1 | 12/2009 | Lerner et al. |
| 2010/0221466 A1 | 9/2010 | Wehrmann |
| 2010/0282824 A1 | 11/2010 | Kannankeril et al. |
| 2011/0165352 A1 | 7/2011 | Wehrmann |
| 2011/0167772 A1 | 7/2011 | Piucci |
| 2012/0084999 A1 | 4/2012 | Davis et al. |
| 2012/0214658 A1 | 8/2012 | Chuba |
| 2013/0011510 A1 | 1/2013 | Chuba |

FOREIGN PATENT DOCUMENTS

| | | |
|---|---|---|
| EP | 1466839 A1 | 10/2004 |
| EP | 2143555 A1 | 1/2010 |
| GB | 2384459 | 7/2003 |
| WO | 97/46453 | 12/1997 |
| WO | 00/71423 | 11/2000 |
| WO | 01/53153 | 7/2001 |
| WO | 01/85434 | 11/2001 |
| WO | 02/26589 | 4/2002 |
| WO | 2005/118408 | 12/2005 |
| WO | 2007/070240 | 6/2007 |
| WO | 2009/058749 | 5/2009 |
| WO | 2010/109727 A1 | 9/2010 |
| WO | 2010/129530 A1 | 11/2010 |
| WO | 2013/022398 A1 | 2/2013 |

OTHER PUBLICATIONS

Amendment from U.S. Appl. No. 13/866,165 dated Mar. 3, 2016.
Office Action from U.S. Appl. No. 14/482,706 dated Apr. 20, 2016.
Office Action from U.S. Appl. No. 13/036,170 dated Jul. 29, 2016.
International Search Report and Written Opinion from PCT/US05/18817 dated Mar. 30, 2007.
International Search Report and Written Opinion from PCT/US06/45447, dated Feb. 22, 2007.
International Search Report and Written Opinion from PCT/US08/81410 dated Mar. 31, 2009.
International Search Report and Written Opinion from PCT/US09/38344 dated Dec. 22, 2009.
International Search Report and Written Opinion for PCT/US12/45718 dated Oct. 22, 2012.
International Search Report and Written Opinion for PCT/US2014/030424 dated Aug. 8, 2014.
International Search Report and Written Opinion for PCT/US2014/054965 dated Feb. 10, 2015.
International Search Report and Written Opinion from PCT/US2014/066799 dated Feb. 24, 2015.
Office action from U.S. Appl. No. 10/408,946 dated Jun. 7, 2004.
Amendment from U.S. Appl. No. 10/408,946 dated Sep. 23, 2004.
Office action from U.S. Appl. No. 10/408,946 dated Jan. 6, 2005.

(56) References Cited

OTHER PUBLICATIONS

Interview Summary from U.S. Appl. No. 10/408,946 dated Mar. 4, 2005.
Response from U.S. Appl. No. 10/408,946 dated Mar. 10, 2005.
Notice of Allowance from U.S. Appl. No. 10/408,946 dated Apr. 25, 2005.
Notice of Allowance from U.S. Appl. No. 10/408,947 dated Dec. 21, 2004.
Office action from U.S. Appl. No. 11/111,164 dated Apr. 27, 2006.
Response from U.S. Appl. No. 11/111,164 dated Jul. 17, 2006.
Notice of Allowance from U.S. Appl. No. 11/111,164 dated Aug. 23, 2006.
Office action from U.S. Appl. No. 11/141,304 dated Nov. 7, 2008.
Amendment from U.S. Appl. No. 11/141,304 dated Jan. 20, 2009.
Office action from U.S. Appl. No. 11/141,304 dated Apr. 28, 2009.
Amendment from U.S. Appl. No. 11/141,304 dated Jun. 24, 2009.
Office action from U.S. Appl. No. 11/141,304 dated Aug. 7, 2009.
Amendment from U.S. Appl. No. 11/141,304 dated Jan. 7, 2010.
Notice of Allowance from U.S. Appl. No. 11/141,304 dated Mar. 31, 2010.
Office action from U.S. Appl. No. 11/194,375 dated Nov. 13, 2006.
Office action from U.S. Appl. No. 11/194,375 dated Feb. 6, 2007.
Amendment from U.S. Appl. No. 11/194,375 dated May 4, 2007.
Office action from U.S. Appl. No. 11/194,375 dated Aug. 21, 2007.
Amendment from U.S. Appl. No. 11/194,375 dated Oct. 2, 2007.
Advisory action from U.S. Appl. No. 11/194,375 dated Oct. 9, 2007.
Office action from U.S. Appl. No. 11/194,375 dated Nov. 20, 2007.
Amendment from U.S. Appl. No. 11/194,375 dated Feb. 29, 2008.
Office action from U.S. Appl. No. 11/194,375 dated Jun. 2, 2008.
Amendment from U.S. Appl. No. 11/194,375 dated Aug. 4, 2008.
Advisory action from U.S. Appl. No. 11/194,375 dated Aug. 12, 2008.
Office action from U.S. Appl. No. 11/194,375 dated Sep. 19, 2008.
Amendment from U.S. Appl. No. 11/194,375 dated Dec. 19, 2008.
Notice of Allowance from U.S. Appl. No. 11/194,375 dated Apr. 10, 2009.
Office action from U.S. Appl. No. 11/252,365 dated Jan. 31, 2008.
Amendment from U.S. Appl. No. 11/252,365 dated Mar. 18, 2008.
Notice of Allowance from U.S. Appl. No. 11/252,365 dated Feb. 27, 2009.
Amendment after Allowance from U.S. Appl. No. 11/252,365 dated Mar. 4, 2009.
Office action from U.S. Appl. No. 11/299,933 dated Mar. 19, 2008.
Response from U.S. Appl. No. 11/299,933 dated Jun. 3, 2008.
Office action from U.S. Appl. No. 11/299,933 dated Sep. 16, 2008.
Response from U.S. Appl. No. 11/299,933 dated Nov. 17, 2008.
Office action from U.S. Appl. No. 11/299,933 dated Dec. 18, 2008.
Amendment from U.S. Appl. No. 11/299,933 dated Mar. 6, 2009.
Office action from U.S. Appl. No. 11/299,933 dated Jun. 12, 2009.
Response to Office action from U.S. Appl. No. 11/299,933 dated Dec. 9, 2009.
Office action from U.S. Appl. No. 11/299,933 dated Dec. 31, 2009.
Response from U.S. Appl. No. 11/299,933 dated Mar. 30, 2010.
Office action from U.S. Appl. No. 11/299,933 dated Jun. 14, 2010.
Response from U.S. Appl. No. 11/299,933 dated Oct. 14, 2010.
Notice of Allowance from U.S. Appl. No. 11/299,933 dated Dec. 28, 2010.
Office action from U.S. Appl. No. 11/496,654 dated Apr. 1, 2009.
Response from U.S. Appl. No. 11/496,654 dated Jun. 26, 2009.
Office action from U.S. Appl. No. 11/496,654 dated Aug. 11, 2009.
Amendment from U.S. Appl. No. 11/496,654 dated Dec. 11, 2009.
Office action from U.S. Appl. No. 11/496,654 dated Jan. 13, 2010.
Amendment from U.S. Appl. No. 11/496,654 dated Jun. 14, 2010.
Office action from U.S. Appl. No. 11/496,654 dated Jun. 28, 2010.
Notice of Allowance from U.S. Appl. No. 11/496,654 dated Jun. 20, 2011.
Pre-Appeal Brief Request and Notice of Appeal from U.S. Appl. No. 11/496,654 dated Nov. 29, 2010.
Response from U.S. Appl. No. 11/496,654 dated May 31, 2011.
Office action from 11/496,645 dated Aug. 31, 2009.
Response from U.S. Appl. No. 11/496,645 dated Nov. 30, 2009.
Notice of Allowance from U.S. Appl. No. 11/496,645 dated Jan. 4, 2010.
Notice of Allowance from U.S. Appl. No. 11/496,645 dated Feb. 26, 2010.
Office action from U.S. Appl. No. 11/594,539 dated Apr. 19, 2010.
Response from U.S. Appl. No. 11/594,539 dated Jul. 19, 2010.
Office action from U.S. Appl. No. 11/594,539 dated Sep. 30, 2010.
Interview Summary from U.S. Appl. No. 11/594,539 dated Dec. 15, 2010.
Notice of Allowance from U.S. Appl. No. 11/594,539 dated Jan. 7, 2011.
Office action from U.S. Appl. No. 11/594,540 dated Sep. 3, 2010.
Response from U.S. Appl. No. 11/594,540 dated Dec. 2, 2010.
Office action from U.S. Appl. No. 11/594,540 dated Feb. 3, 2011.
Response from U.S. Appl. No. 11/594,540 dated Jul. 5, 2011.
Office action from U.S. Appl. No. 11/594,540 dated Jul. 22, 2011.
Response from U.S. Appl. No. 11/594,540 dated Dec. 15, 2011.
Final Office Action from U.S. Appl. No. 11/594,540 dated Mar. 5, 2012.
Response to Office Action and Request for RCE from U.S. Appl. No. 11/594,540 dated Jun. 28, 2012.
Office Action from U.S. Appl. No. 11/594,540 dated Jul. 16, 2012.
Response to Office Action in U.S. Appl. No. 11/594,540 dated Oct. 15, 2012.
Notice of Allowance in U.S. Appl. No. 11/594,540 dated Dec. 28, 2012.
Supplemental Notice of Allowance for U.S. Appl. No. 11/594,540 dated Mar. 4, 2013.
Office action from U.S. Appl. No. 12/259,419 dated Sep. 16, 2011.
Amendment in Response to Non-Final Office Action in U.S. Appl. No. 12/259,419 dated Dec. 7, 2011.
Office action from U.S. Appl. No. 12/259,419 dated Jan. 18, 2012.
Reasons for Requesting Pre-Appeal Brief Review from U.S. Appl. No. 12/259,419 dated Jun. 18, 2012.
Notice of Allowance and Fees due for U.S. Appl. No. 12/259,419 dated Sep. 24, 2012.
Examiner Initiated Interview Summary in U.S. Appl. No. 12/259,419 dated Dec. 7, 2012.
Office action from U.S. Appl. No. 12/394,781 dated Jun. 10, 2011.
Response from U.S. Appl. No. 12/394,781 dated Oct. 10, 2011.
Final Office Action from U.S. Appl. No. 12/394,781 dated Feb. 15, 2012.
Notice of Allowance from U.S. Appl. No. 12/394,781 dated Aug. 4, 2015.
Reasons for Requesting Pre-Appeal Brief Review from U.S. Appl. No. 12/394,781 dated Aug. 3, 2012.
Notice of Panel Decision from Pre-Appeal Brief Review for U.S. Appl. No. 12/394,781 dated Aug. 22, 2012.
Office Action for U.S. Appl. No. 12/394,781 dated Jan. 3, 2013.
Amendment in Response to office action in U.S. Appl. No. 12/394,781 dated Jul. 2, 2013.
Final Office Action in U.S. Appl. No. 12/394,781 dated Oct. 11, 2013.
Non-Final Office Action from U.S. Appl. No. 12/394,781 dated Dec. 16, 2014.
Response to Office Action from U.S. Appl. No. 12/394,781 dated Apr. 16, 2015.
Non final office action for U.S. Appl. No. 13/739,049 dated Jun. 20, 2013.
Office action for U.S. Appl. No. 13/739,049 dated Jan. 28, 2014.
Response to Office Action for US U.S. Appl. No. 13/739,049 dated Mar. 5, 2014.
Final Office Action for U.S. Appl. No. 13/739,049 dated Mar. 28, 2014.
Notice of Appeal, Pre-Appeal Brief Request for Review and Reasons for Request for Pre-Appeal Brief Review for U.S. Appl. No. 13/739,049 dated Sep. 25, 2014.
Office Action for U.S. Appl. No. 13/739,049 dated Mar. 10, 2015.
Response to Office Action for U.S. Appl. No. 13/739,049 dated Aug. 10, 2015.
Final Office Action for U.S. Appl. No. 13/739,049 dated Sep. 16, 2015.

(56) References Cited

OTHER PUBLICATIONS

Response to Final Office Action for U.S. Appl. No. 13/739,049 dated Oct. 20, 2015.
Notice of Allowance for U.S. Appl. No. 13/739,049 dated Nov. 10, 2015.
Office action from U.S. Appl. No. 12/409,026 dated Feb. 4, 2010.
Response from U.S. Appl. No. 12/409,026 dated May 3, 2010.
Notice of Allowance from U.S. Appl. No. 12/409,026 dated Jun. 17, 2010.
Office action from U.S. Appl. No. 12/818,318 dated Dec. 10, 2010.
Response from U.S. Appl. No. 12/818,318 dated Jun. 10, 2011.
Office action from U.S. Appl. No. 12/818,318 dated Jul. 29, 2011.
Response to Final Office Action from U.S. Appl. No. 12/818,318 dated Dec. 29, 2011.
Office action from U.S. Appl. No. 12/818,318 dated Mar. 8, 2012.
Response to Office Action from U.S. Appl. No. 12/818,318 dated Jul. 9, 2012.
Final Office Action from U.S. Appl. No. 12/818,318 dated Aug. 8, 2012.
Amendment with RCE for U.S. Appl. No. 12/818,318 dated Feb. 6, 2013.
Office action from U.S. Appl. No. 12/818,318 dated Jul. 12, 2013.
Response to Office Action in U.S. Appl. No. 12/818,318 dated Dec. 12, 2013.
Final Office Action from U.S. Appl. No. 12/818,318 dated Feb. 26, 2014.
Office action from U.S. Appl. No. 12/507,220 dated Oct. 22, 2009.
Response to Office action from U.S. Appl. No. 12/507,220 dated Apr. 16, 2010.
Office action from U.S. Appl. No. 12/507,220 dated May 6, 2010.
Response from U.S. Appl. No. 12/507,220 dated Aug. 5, 2010.
Office action from U.S. Appl. No. 12/507,220 dated Aug. 12, 2010.
Amendment from U.S. Appl. No. 12/507,220 dated Dec. 13, 2010.
Office action from U.S. Appl. No. 12/507,220 dated Jan. 28, 2011.
Office Action from U.S. Appl. No. 13/036,170 dated Nov. 26, 2012.
Response to Office Action for U.S. Appl. No. 13/036,170 dated May 28, 2013.
Final Office Action from U.S. Appl. No. 13/036,170 dated Aug. 16, 2013.
Amendment with RCE for U.S. Appl. No. 13/036,170 dated Feb. 14, 2014.
Non-final Office Action from U.S. Appl. No. 13/036,170 dated Mar. 27, 2014.
Final Office Action from U.S. Appl. No. 13/036,170 dated Dec. 3, 2014.
Office Action from U.S. Appl. No. 13/036,172 dated Jan. 9, 2012.
Response to Non-Final Office Action from U.S. Appl. No. 13/036,172 dated Jun. 11, 2012.
Office Action from U.S. Appl. No. 13/036,172 dated Aug. 21, 2012.
Response to Final Office Action with Terminal Disclaimer from U.S. Appl. No. 13/036,172 dated Oct. 26, 2012.
Notice of Allowance for U.S. Appl. No. 13/036,172 dated Nov. 16, 2012.
Office Action for U.S. Appl. No. 13/739,049 dated Jun. 20, 2013.
Office Action for U.S. Appl. No. 13/666,165 dated Sep. 18, 2013.
Response in U.S. Appl. No. 13/866,165 dated Mar. 14, 2014.
Office Action for U.S. Appl. No. 13/866,165 dated May 21, 2014.
Office Action for U.S. Appl. No. 13/866,165 dated Nov. 10, 2014.
Response to Office Action for U.S. Appl. No. 13/866,165 dated Apr. 6, 2015.
Final Office Action for U.S. Appl. No. 13/866,165 dated Jun. 18, 2015.
Response to Office Action for U.S. Appl. No. 13/866,165 dated Nov. 18, 2015.
Preliminary Amendment in U.S. Appl. No. 13/543,082 dated Jul. 22, 2013.
Office Action from U.S. Appl. No. 13/543,082 dated Jun. 19, 2014.
Amendment from U.S. Appl. No. 13/543,082 dated Dec. 19, 2014.
Office Action from U.S. Appl. No. 13/543,082 dated Apr. 6, 2015.
Response to Office Action from U.S. Appl. No. 13/543,082 dated Sep. 4, 2015.
Notice of Allowance from U.S. Appl. No. 13/543,082 dated Oct. 14, 2015.
Amendment After Allowance from U.S. Appl. No. 13/543,082 dated Nov. 17, 2015.
Notice of allowance from U.S. Appl. No. 29/346,902 dated Sep. 9, 2010.
Office action from U.S. Appl. No. 29/383,234 dated Mar. 9, 2011.
Response from U.S. Appl. No. 29/383,234 filed Jun. 7, 2011.
Notice of Allowance from U.S. Appl. No. 29/383,234 dated Jul. 12, 2011.
Office action from U.S. Appl. No. 13/866,165 dated Sep. 18, 2013.
Office action from Canadian Application No. 2,463,389 dated Apr. 23, 2010.
Response from Canadian Application No. 2,463,389 dated Oct. 25, 2010.
Office action from Canadian Application No. 2,463,357 dated Oct. 20, 2010.
Office action from Canadian Application No. 2,569,049 dated Oct. 11, 2011.
Notification of References Cited regarding Canadian Application No. 2,569,049 dated Feb. 16, 2012.
One page drawing, BRIGGS BAG 1, illustrates a web of pre-formed bags sold by Applicant for use in Applicant's SP machines more than one year prior to the priority date of the present application. Operation of Applicant's SP machines is disclosed by U.S. Pat. Nos. 4,969,310; 5,743,070; 5,944,424; 5,722,218; and 6,035,611.
One page drawing, GOODY BAG 1, illustrates a web of pre-formed bags sold by Applicant for use in Applicant's SP machines more than one year prior to the priority date of the present application. Operation of Applicant's SP machines is disclosed by U.S. Pat. Nos. 4,969,310; 5,743,070; 5,944,424; 5,722,218; and 6,035,611.
Office action from U.S. Appl. No. 13/866,165 dated Dec. 3, 2015.
Notice of Allowance from U.S. Appl. No. 29/332,921 dated Aug. 11, 2009.
Response to Office Action from U.S. Appl. No. 13/036,170 dated May 11, 2016.
Office Action from U.S. Appl. No. 13/866,165 dated May 31, 2016.
Office Action from U.S. Appl. No. 15/040,447 dated May 5, 2016.
Office Action from U.S. Appl. No. 14/550,034 dated Jun. 10, 2016.

* cited by examiner

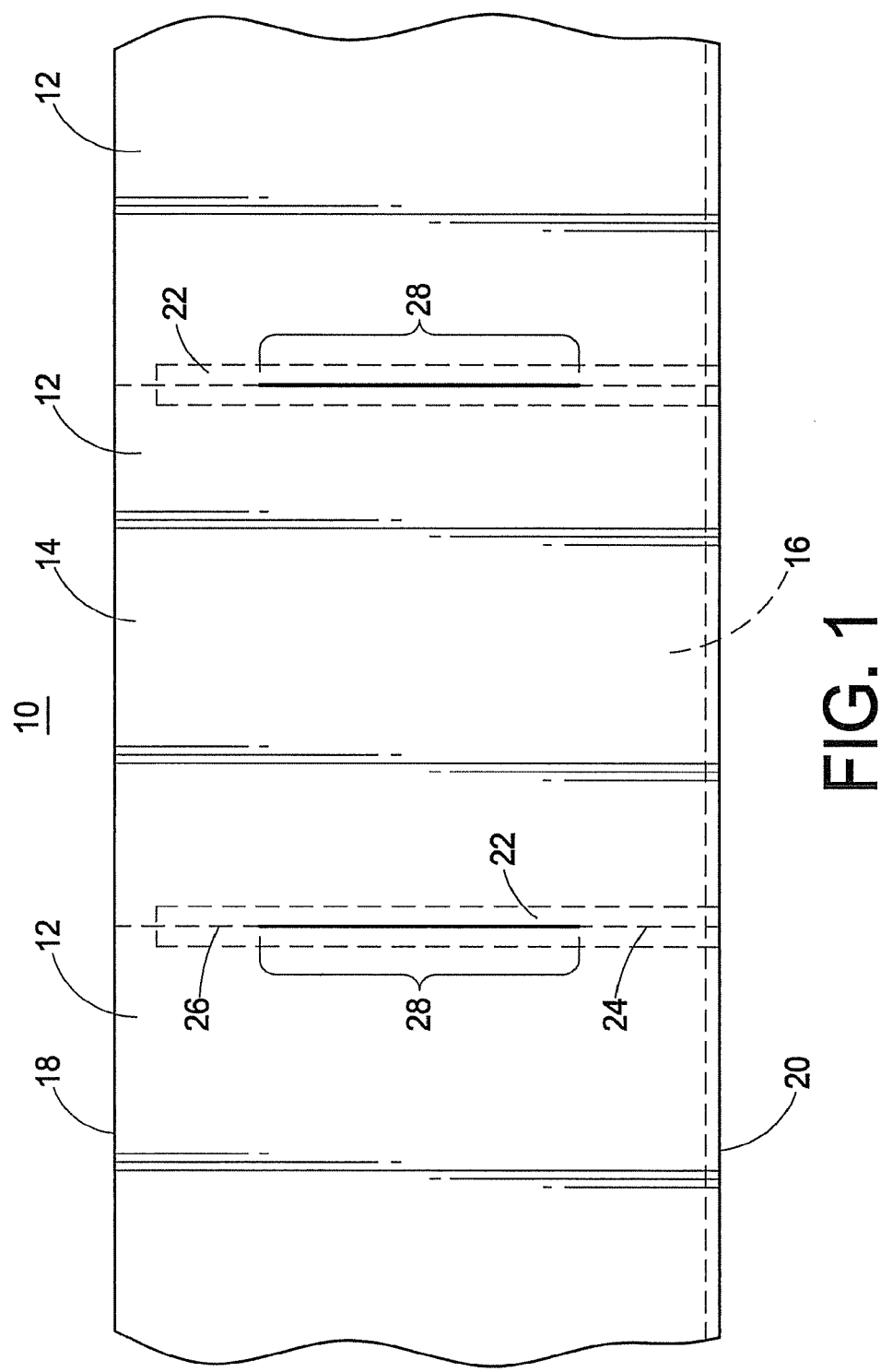

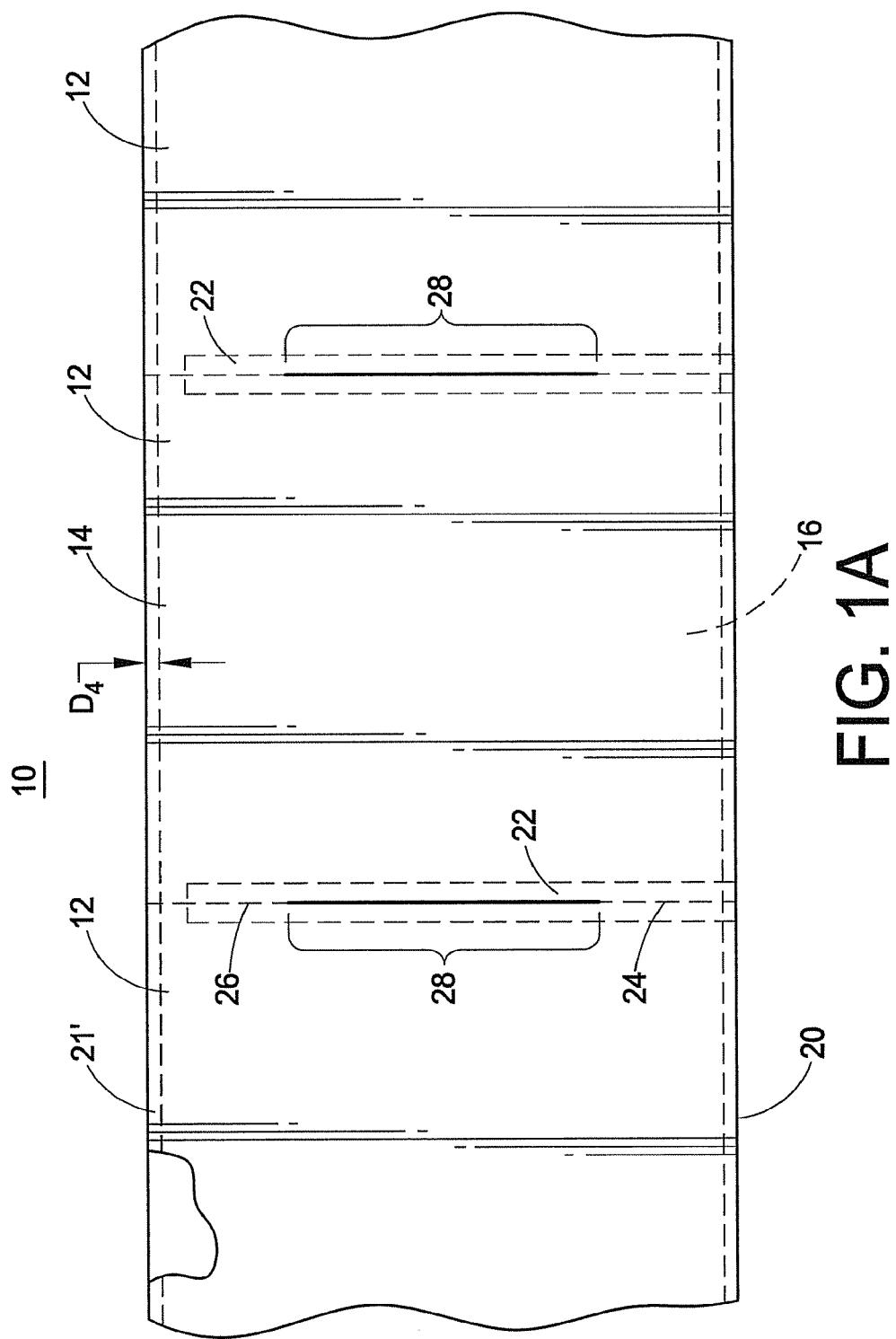

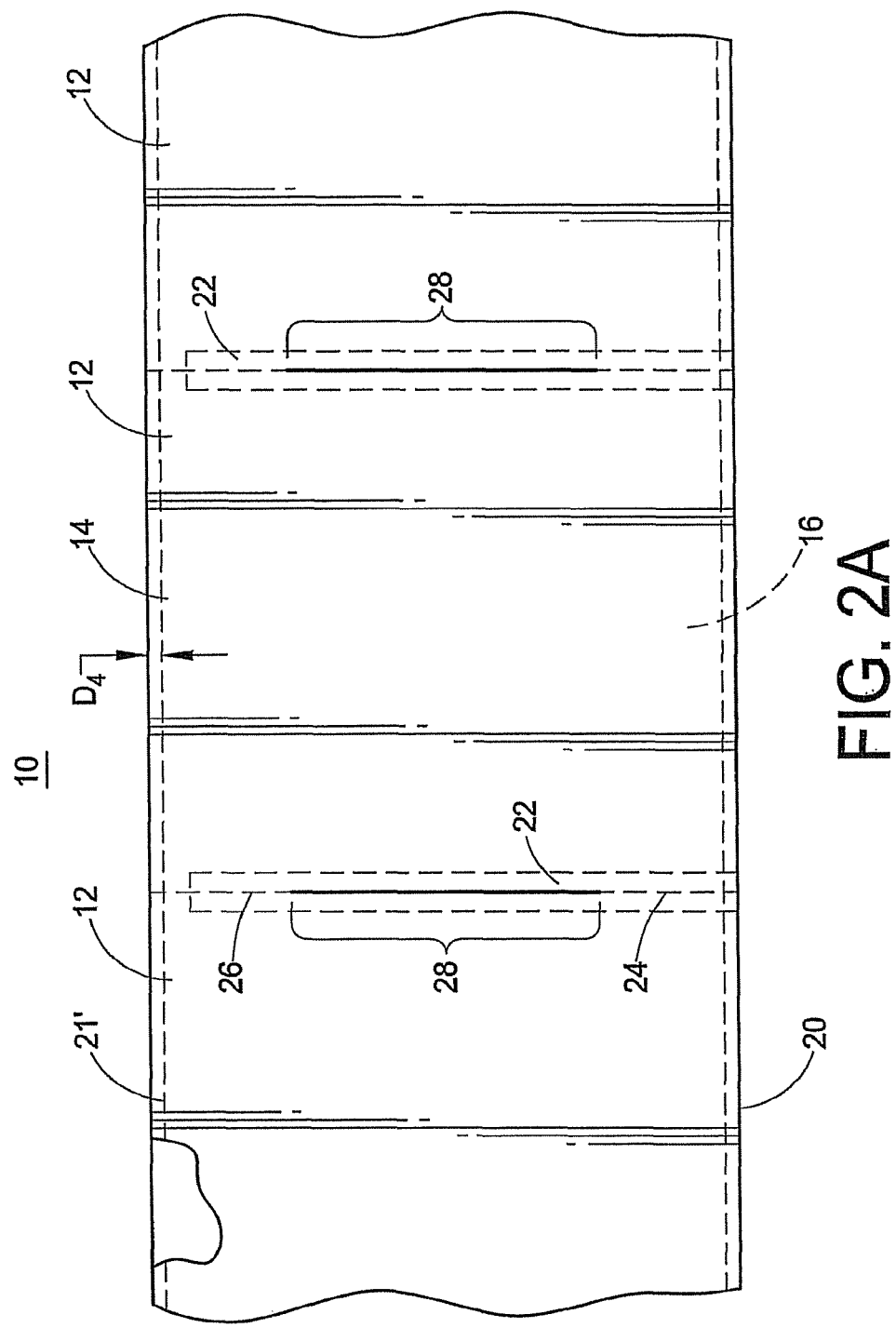

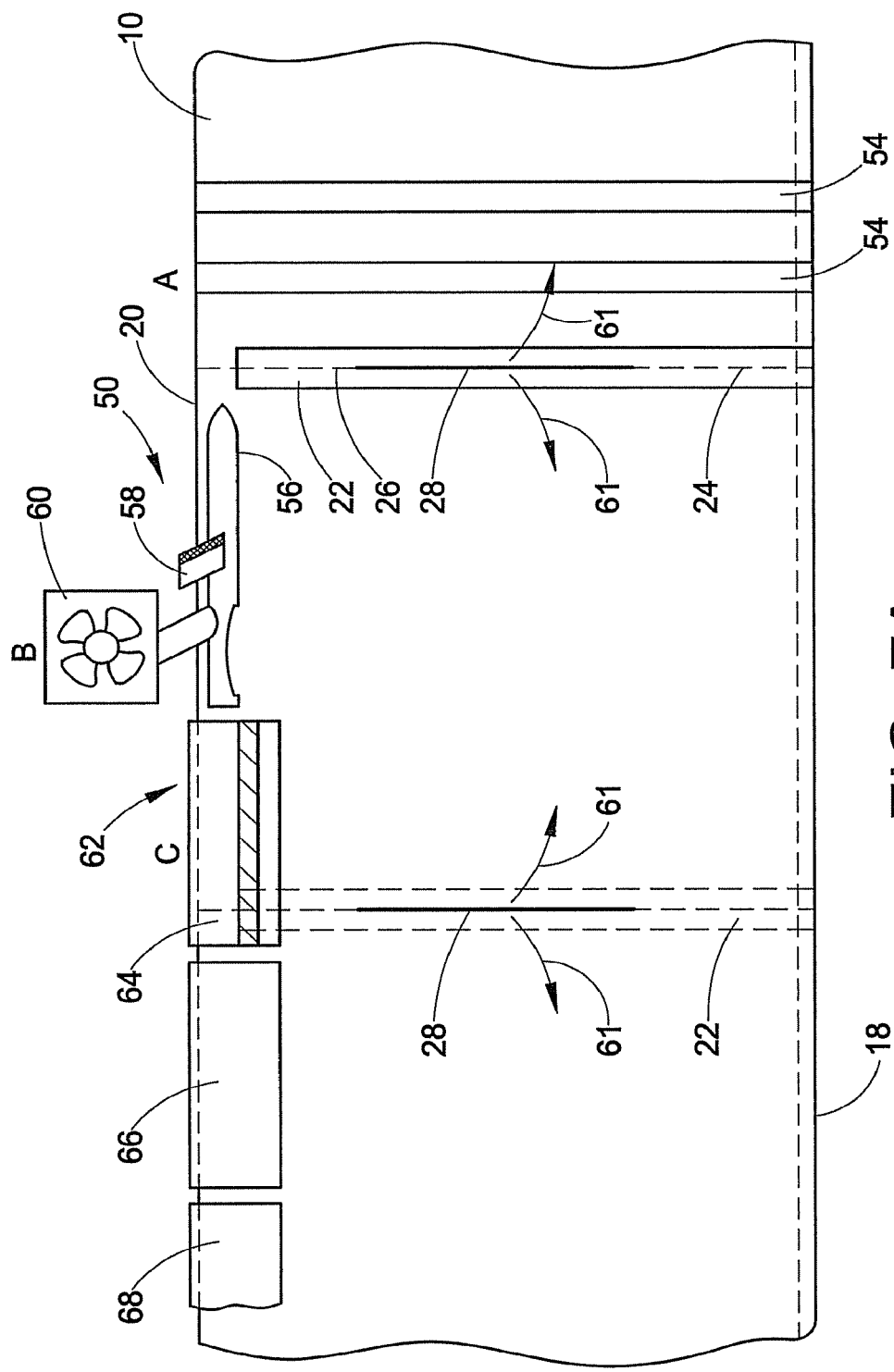

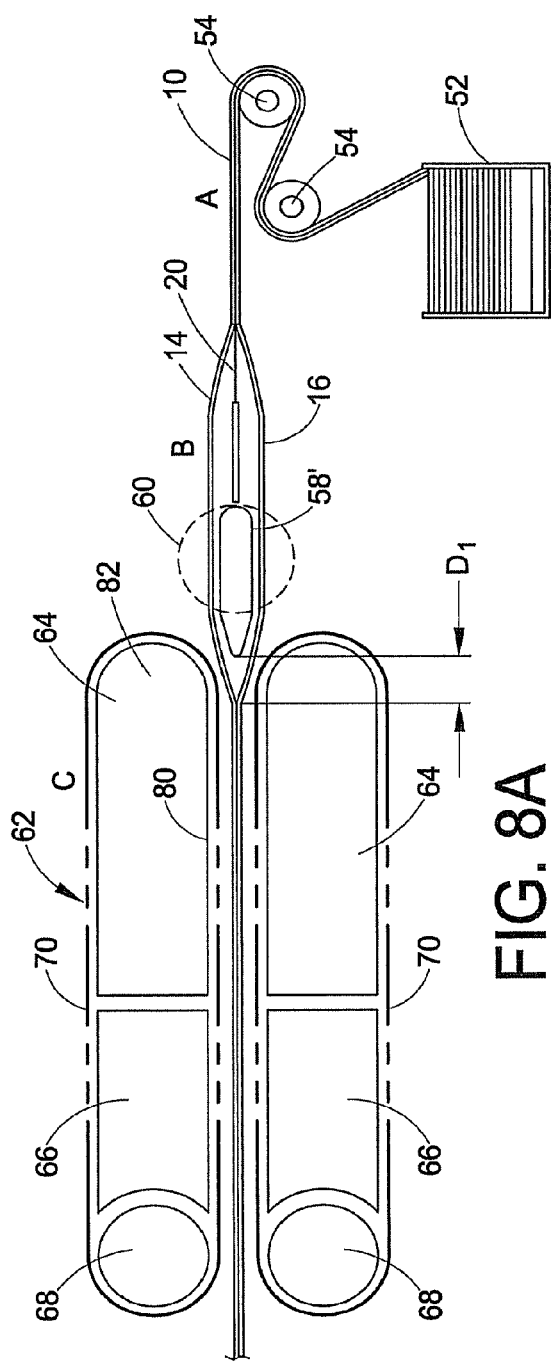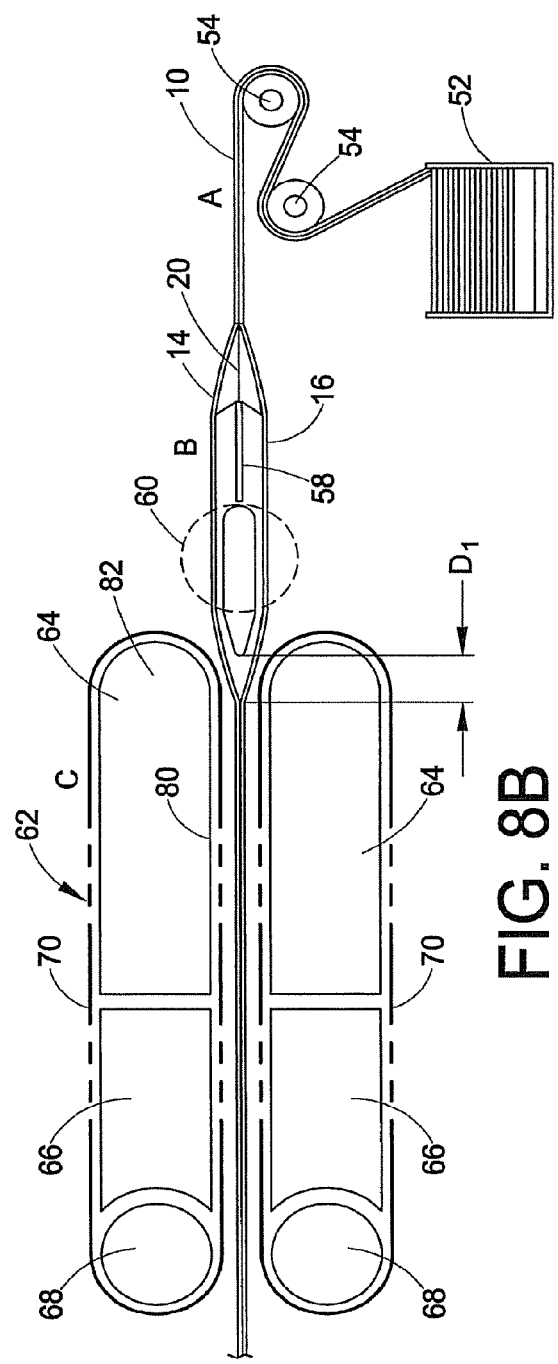

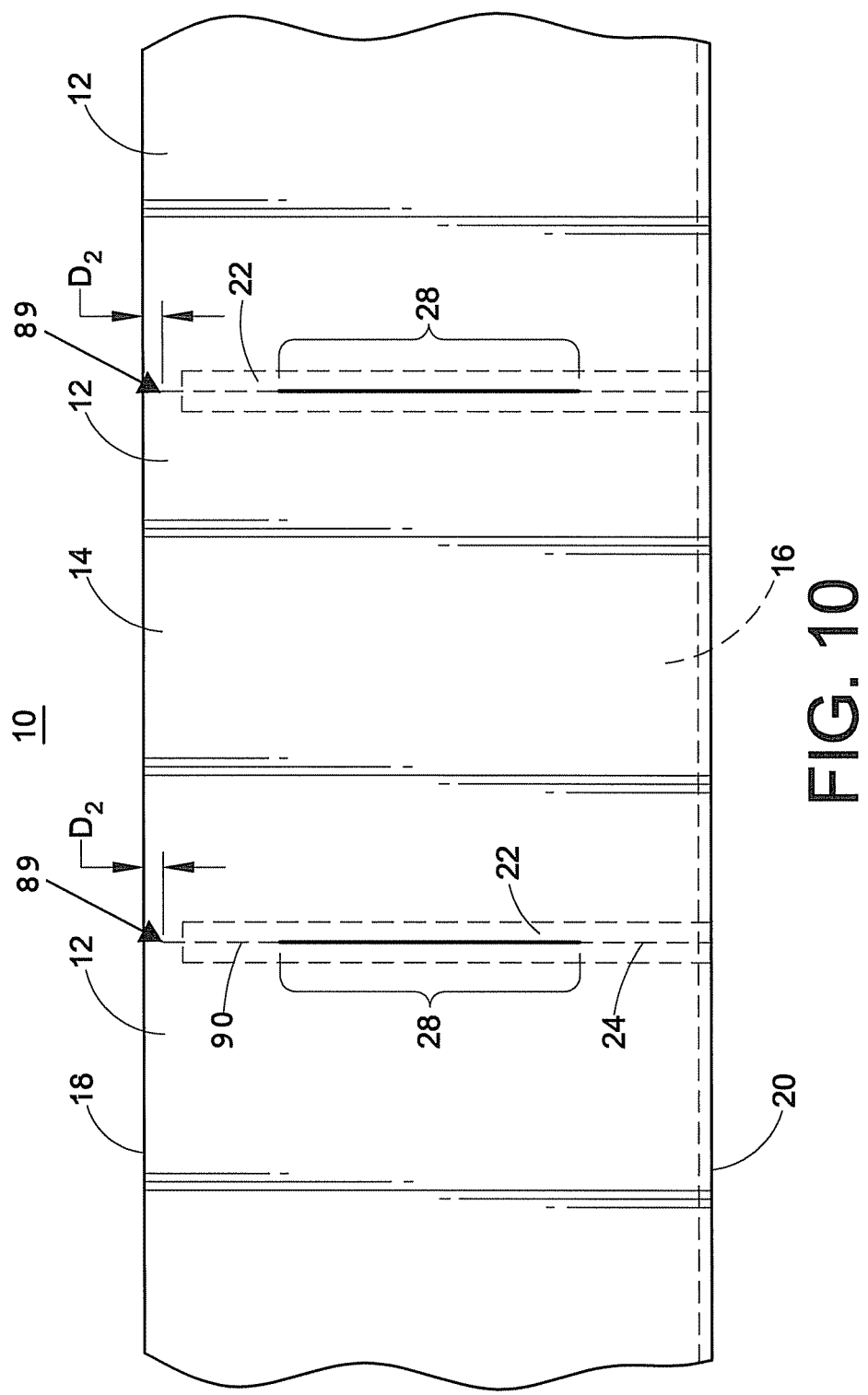

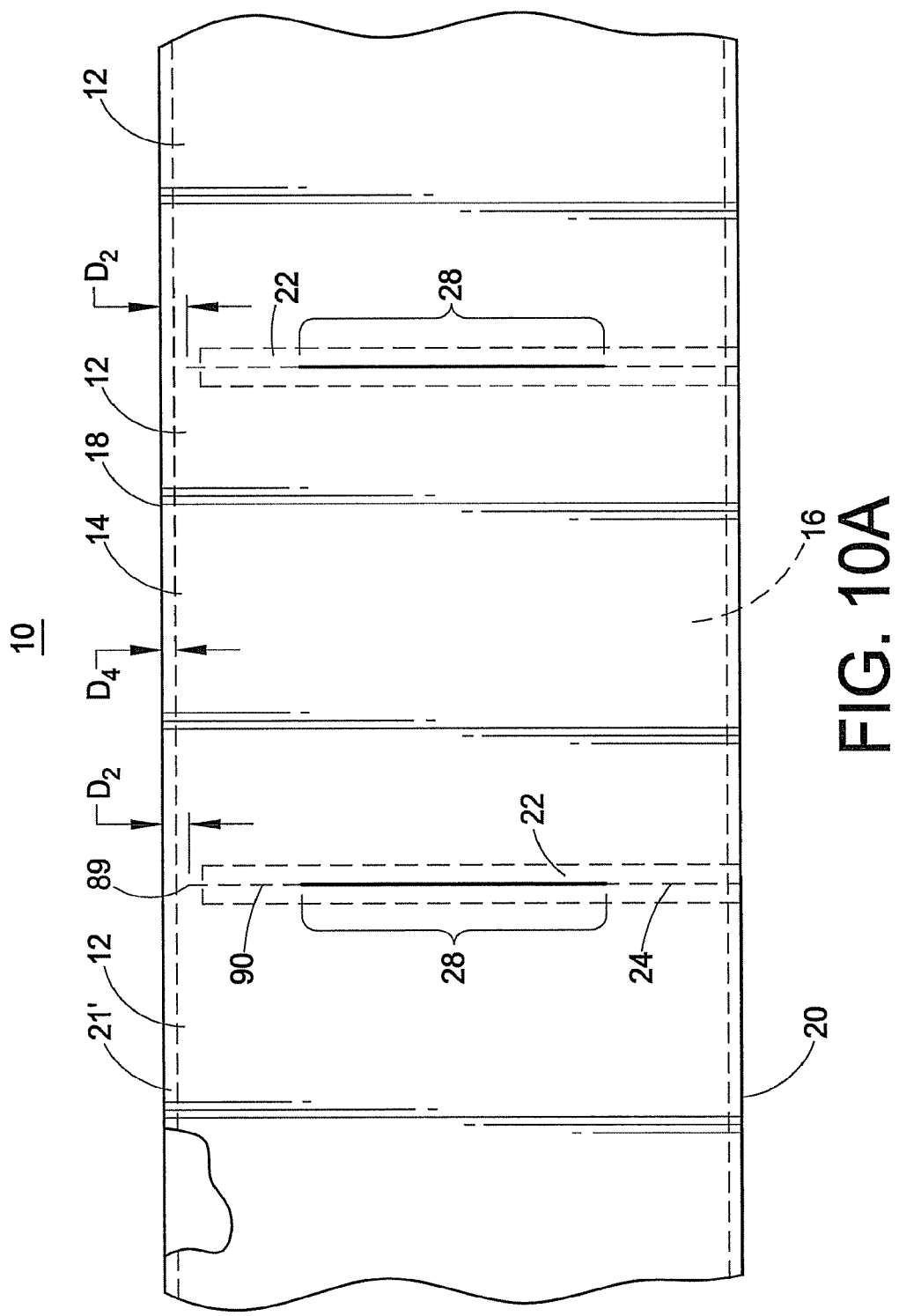

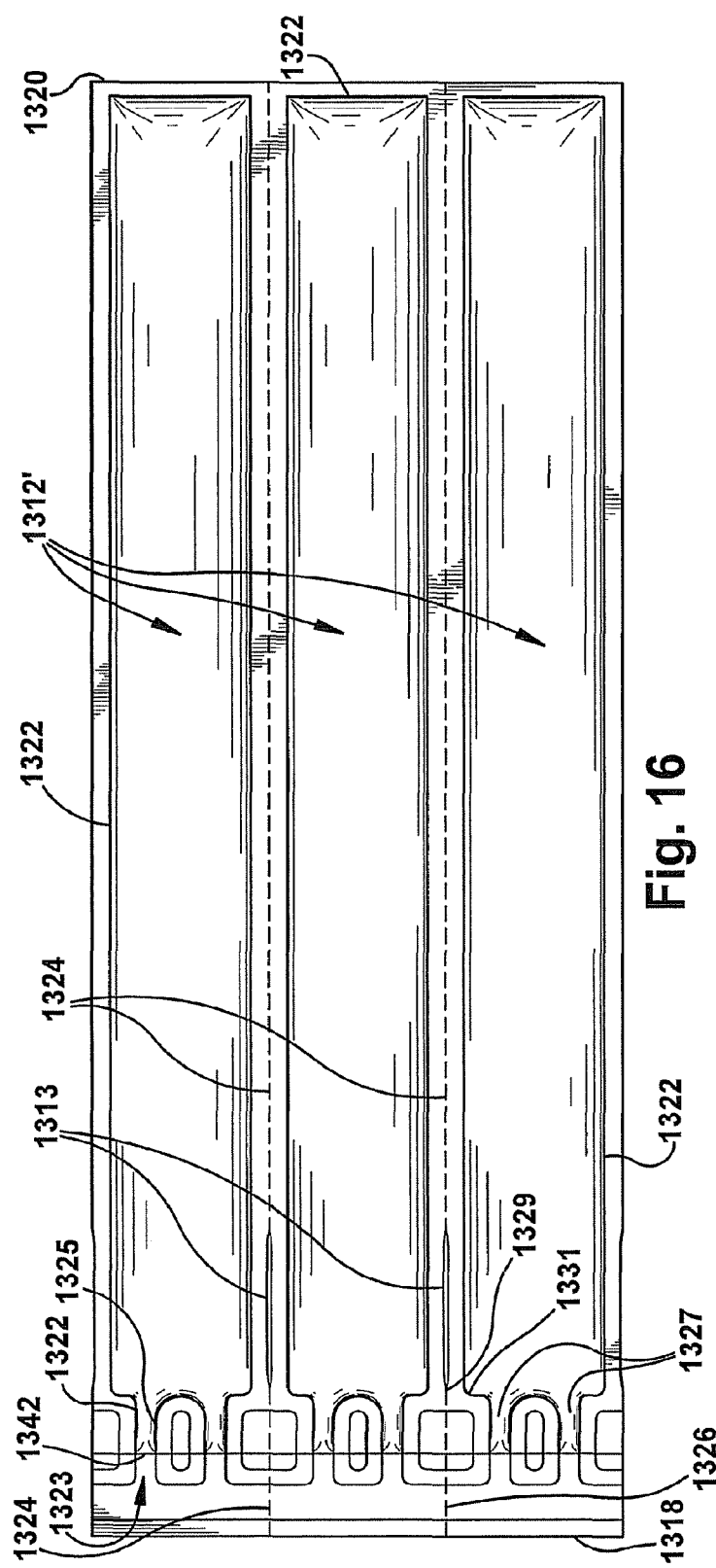
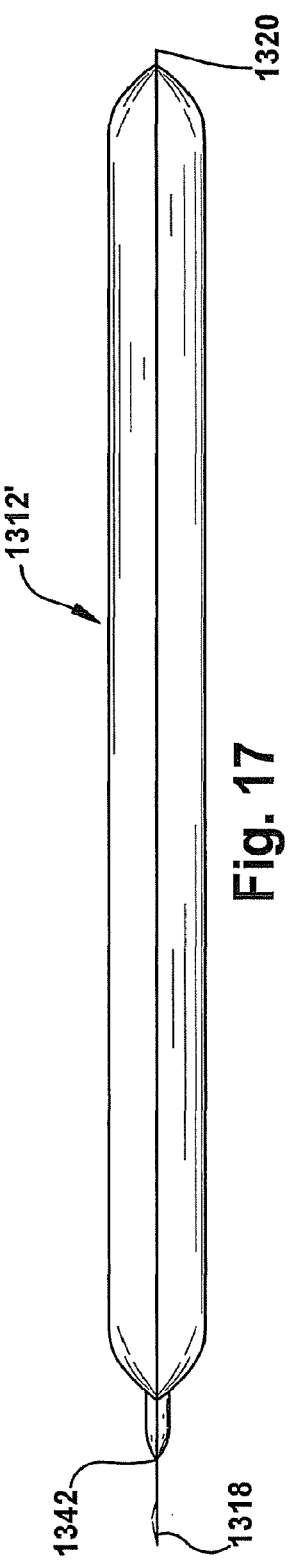

WEB AND METHOD FOR MAKING FLUID FILLED UNITS

RELATED APPLICATIONS

This application claims priority to and the benefits of U.S. application Ser. No. 12/394,781, filed Feb. 27, 2009, now U.S. Pat. No. 9,205,622, titled WEB AND METHOD FOR MAKING FLUID FILLED UNITS, which application is incorporated herein by reference in its entirety.

FIELD OF THE INVENTION

The present application relates to fluid filled units and more particularly to plastic webs of interconnected pouches and to processes of converting interconnected pouches to fluid filled units.

BACKGROUND

Machines for forming and filling dunnage units from sheets of plastic are known. Machines which produce dunnage units by inflating preformed pouches in a preformed web are also known. For many applications, machines which utilize preformed webs are preferred.

Typically, the sides of adjacent dunnage units formed from a preformed web are connected by perforations. For example, published United States Patent Application Publication No. 2006/0042191 (assigned to the Assignee of the present application) discloses a web and method for making fluid filled units. United States patent Application Publication Pub. No. 2006/0042191 is incorporated herein by reference in its entirety

SUMMARY

Webs, methods, and apparatus for forming dunnage units are disclosed by the present application. The webs include first and second elongated layers. A plurality of seals that hermetically join the first elongated layer to the second elongated layer to form a plurality of inflatable pouches and an inflation channel that is in fluid communication with pouches and is disposed outside of the pouches. An inflation side line of perforations, a gap forming area, and an opposite side line of perforations are arranged in a line between pair(s) of the pouches.

Further advantages and benefits will become apparent to those skilled in the art after considering the following description and appended claims in conjunction with the accompanying drawings.

BRIEF DESCRIPTION OF THE DRAWINGS

FIG. 1 illustrates a web for making fluid filled units;
FIG. 1A illustrates a web for making fluid filled units;
FIG. 2A illustrates a web for making fluid filled units;
FIG. 7A schematically illustrates a plan view of a process and machine for converting web pouches to fluid filled units;
FIG. 8A schematically illustrates an elevational view of the process and machine for converting web pouches to fluid filled units;
FIG. 8B schematically illustrates an elevational view of the process and machine for converting web pouches to fluid filled units;
FIG. 10 illustrates a web for making fluid filled units;
FIG. 10A illustrates a web for making fluid filled units;
FIG. 16 is a top view of the fluid filled units shown in FIG. 15;
and
FIG. 17 is a side view of the fluid filled units shown in FIG. 15.

DETAILED DESCRIPTION

Figure 2:
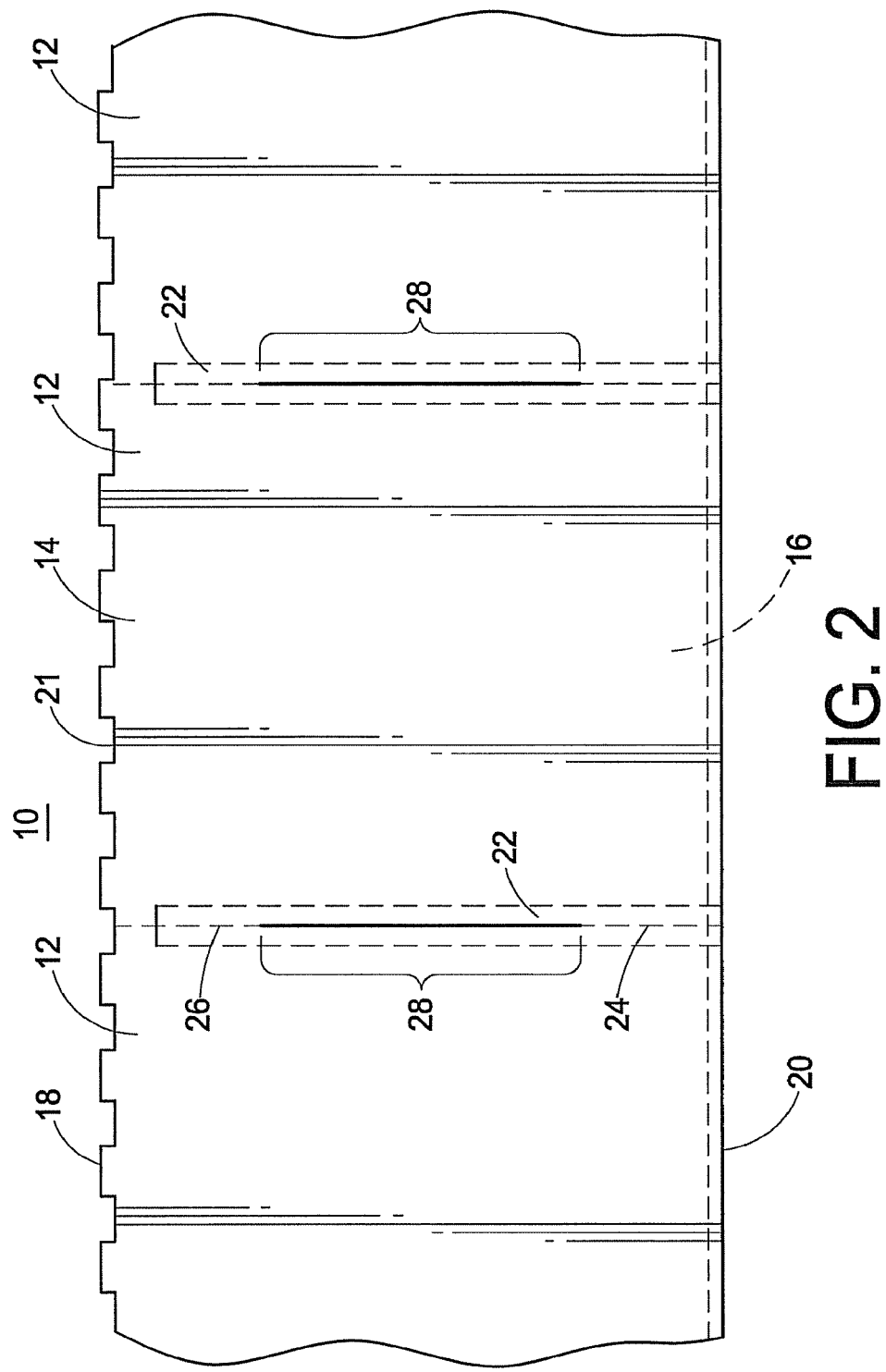
FIG. 2 illustrates a web for making fluid filled units.

Referring to FIGS. 1 and 2, exemplary illustrations of webs 10 of inflatable pouches 12 are shown. The webs 10 include a top elongated layer of plastic 14 superposed onto a bottom layer of plastic 16. The layers are connected together along spaced edges, referred to as the inflation edge 18 and the opposite edge 20. In the example illustrated by FIG. 1, each edge 18, 20 is either a fold or a seal that connects the superposed layers 14, 16 along the edges 18, 20. The connection at the opposite edge 20 is illustrated as a hermetic seal and the connection at the inflation edge 18 is illustrated as a fold in FIG. 1. However, the fold and the seal could be reversed or both of the connections could be seals in the FIG. 1 embodiment.

In the example illustrated by FIG. 2, the inflation edge 18 comprises a frangible connection 21 and the opposite edge 20 is a hermetic seal. The illustrated frangible connection 21 is a line of perforations. The size of the perforations is exaggerated to clarify FIG. 2. The frangible connection 21 may be formed by folding the inflation edge 18 and pulling the inflation edge over a serration forming wheel (not shown). FIG. 2A illustrates a web 10 of inflatable pouches 12 in which a frangible connection 21' is present in one of the superposed layers, in the described embodiment layer 14, at a location offset from the inflation edge 18 by a distance $D_4$. In an exemplary embodiment, the distance $D_4$ is between 0.075 and 0.2 inches, in an exemplary embodiment between 0.09375 and 0.15625 inches. The frangible connection can be formed in a wide variety of different ways any of which can be used. For example, the frangible connection 21' can be formed by pulling the web over a serration forming wheel (not shown) prior to folding the inflation edge or by providing a serration backing plate (not shown) interposed between the layers where the serration forming wheel contacts the web so that only a single layer is acted on by the wheel.

Referring to FIGS. 1, 2, 2A a plurality of longitudinally spaced, transverse seals 22 join the top and bottom layers 14, 16. Generally, each transverse seal 22 extends from the opposite edge 20 to within a short distance of the inflation edge 18. Spaced pairs of lines of perforations 24, 26 extend through the top and bottom layers terminating a short distance from the edges 18, 20 respectively. A gap forming area 28 extends between each associated pair of lines of perforations 24, 26. The gap forming area 28 opens to form a gap 13 when the pouches are inflated (see FIG. 3).

A gap forming area 28 denotes an area, preferably linear in shape, that will rupture or otherwise separate when exposed to a predetermined inflation force. The magnitude of the inflation force is less than the magnitude of the force needed to rupture or separate the spaced apart lines of perforations 24, 26. The gap forming area 28 can take on a number of embodiments, as will be discussed below. Any method that produces an area between the spaced apart lines of perforations 24, 26 that ruptures or otherwise separates at a force lower than a force needed to rupture or separate spaced lines of perforations 24, 26 may be employed to make the gap forming area 28.

Figure 3:
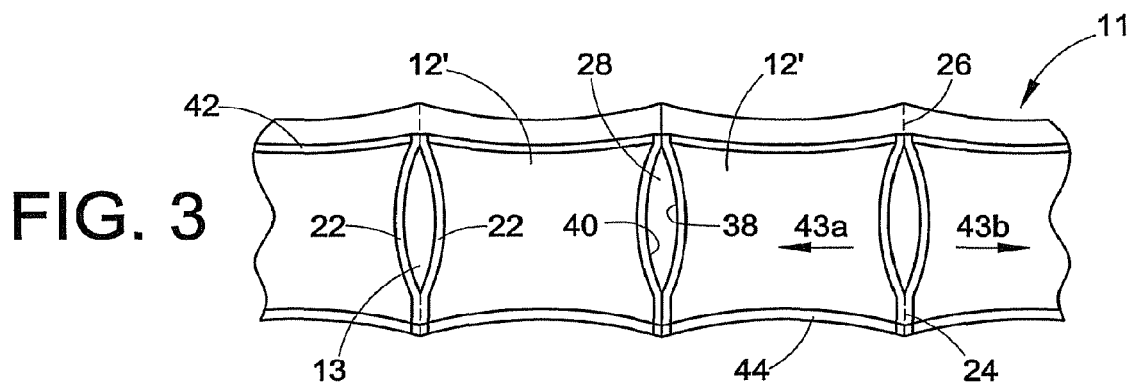
FIG. 3 illustrates a web with pouches inflated and sealed to form fluid filled units.

Referring to FIG. 3, the web 10 of pouches 12 (FIGS. 1, 2, 2A) is inflated and sealed to form a row 11 of dunnage units 12'. The formed dunnage units 12' are configured to be much easier to separate from one another than prior art arrays of dunnage units. In the exemplary embodiment of FIG. 3, each adjacent pair of dunnage units 12' is connected together by a pair of spaced apart lines of perforations 24, 26. The spaced apart lines of perforations 24, 26 are spaced apart by a gap 13. A single row 11 of dunnage units 12' can be graphically described as being in a "ladder" configuration. This configuration makes separating two adjacent dunnage units 12' much easier than separating prior art arrays of dunnage units. To separate a pair of adjacent dunnage units 12, a worker simply inserts an object or objects, such as a hand or hands, into the gap 13 and pulls one dunnage unit 12' away from the other dunnage unit 12'. In the alternative, a mechanical system can be used to separate dunnage units 12'. A machine can be configured to insert an object between adjacent dunnage units 12' and apply a force to separate the units Referring to FIGS. 1-3, prior to conversion to a dunnage unit, a pouch is typically hermetically sealed on three sides, leaving one side open to allow for inflation. Once the pouch is inflated, the inflation opening is hermetically sealed and the dunnage unit is formed. During the inflation process, as the volume of the pouch increases the sides of the pouch have a tendency to draw inward. Drawing the sides of the pouches inward will shorten the length of the sides of the pouch unless the sides of the pouch are constrained. In this application, the term foreshortening refers to the tendency of the length of a pouch side to shorten as the pouch is inflated. In prior art webs, the sides of the pouch are restrained, because sides of adjacent pouches are connected by lines of perforations that extend along the entire length of the pouches and remain intact during and after inflation. The foreshortening of the unrestrained sides, such as the inflation opening, may not be uniform. Restraining the sides of adjacent connected pouches can cause undesirable inflation induced stresses. These undesirable stresses caused because sides of adjacent pouches are connected and restrained, thus, limiting inflation and causing wrinkles to develop in the layers at the unrestrained inflation opening. The wrinkles can extend into a section of the inflation opening to be sealed to complete the dunnage unit, which may comprise the seal. One reason the seal can be compromised is that wrinkling can cause sections of the layers 14, 16 to fold on top of one another. A sealing station of a dunnage machine is typically set to apply the appropriate amount of heat to seal two layers of material. The sealing of multiple layers of material in the area of a wrinkle results in a seal that is weaker than remaining seal areas and may result in a small leak or tendency to rupture at loads lower than loads at which the dunnage units is designed to rupture.

In the embodiment illustrated by FIG. 3, the gap forming area 28, produces a gap 13 between adjacent pouches upon inflation. The gap allows foreshortening of the connected pouch sides and thereby reduces the undesirable stresses that are introduced during inflation as compared with prior art webs. In addition, the web with a gap 13 facilitates fuller inflation of each pouch. The gap 13 maintains the inflation opening substantially free of wrinkles as the inflation opening is sealed to convert the inflated pouches to a dunnage units.

The illustrated web 10 is constructed from a heat sealable plastic film, such as polyethylene. The web 10 is designed to accommodate a process for inflating each pouch 12 in the web to create a row or ladder 11 of dunnage units 12'. The gap forming area 28 creates a gap 13 between dunnage units 12', which facilitate a efficient and effective process for separating adjacent dunnage units 12' in the row or ladder 11.

Figure 4:
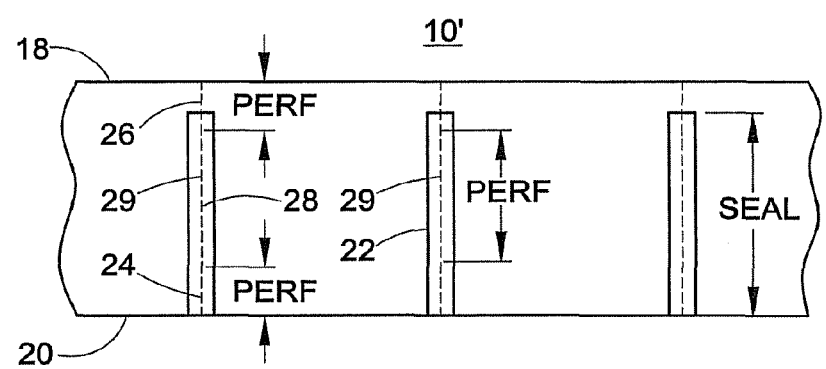
FIG. 4 illustrates a web for making fluid filled units.

In the example illustrated by FIG. 4, the gap forming area 28 defined by the web 10' includes an easily breakable line of perforations 29 between the spaced lines of perforations 24, 26. The force needed to rupture or separate the line of perforations 29 is less than the force needed to separate the perforations 24, 26 extending inward of the web edges 18, 20. Each pair of perforations 24, 26 and associated more easily breakable line of perforations 29 divide the transverse seal 22 into two transverse sections. As a pouch 12 is inflated, the line of perforation 29 begins to rupture or separate leading to the development of a gap 13 between the produced dunnage units 12' (See FIG. 3). Once the pouch 12 is fully inflated, the line of perforations 29 is fully or nearly fully ruptured; however the perforations 24, 26 at the edges remain intact. These perforations 24, 26 are ruptured or separated when a worker or automated process mechanically separates the perforations 24, 26.

Figure 5:
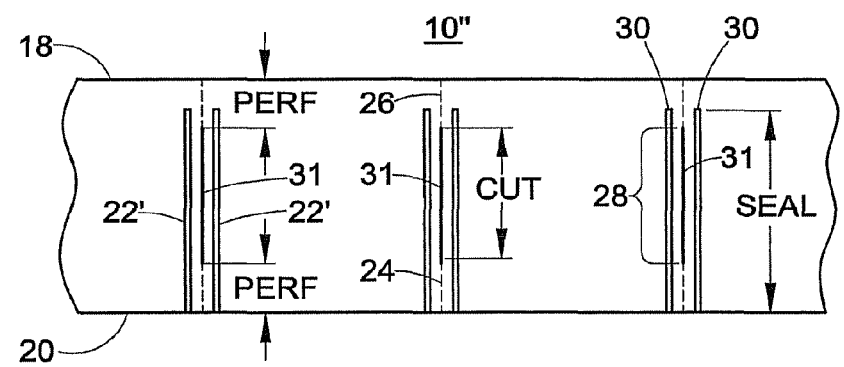
FIG. 5 illustrates a web for making fluid filled units.

FIG. 5 illustrates another embodiment of the web 10". In this embodiment the gap forming area 28 comprises an elongated cut 31 through both layers of material 14, 16. The cut 31 extends between each associated pair of lines of perforations 24, 26. In the embodiment illustrated by FIG. 5, pairs 30 of transverse seals 22' extend from the opposite edge 20 to within a short distance of the inflation edge 18. Each of the pairs of lines of perforations 24, 26 and corresponding cuts 31 are between an associated pair of transverse seals 30. It should be readily apparent that the seal 22 shown in FIG. 4 could be used with the cut 31 shown in FIG. 5. It should also be readily apparent that the line of perforations shown in FIG. 4 could be used with the transverse seals 22' shown in FIG. 5. It should be additionally apparent that any gap forming area 28 can be used with either of the transverse seal configurations 22, 22' shown in FIGS. 4 and 5.

Figure 6:
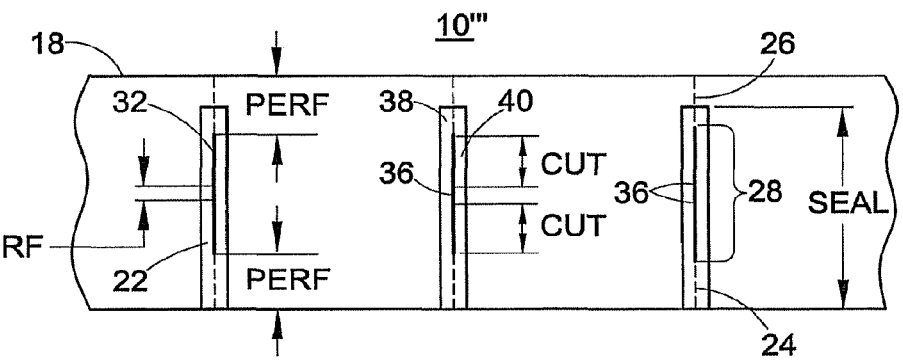
FIG. 6 illustrates a web for making fluid filled units.
Figure 7B:
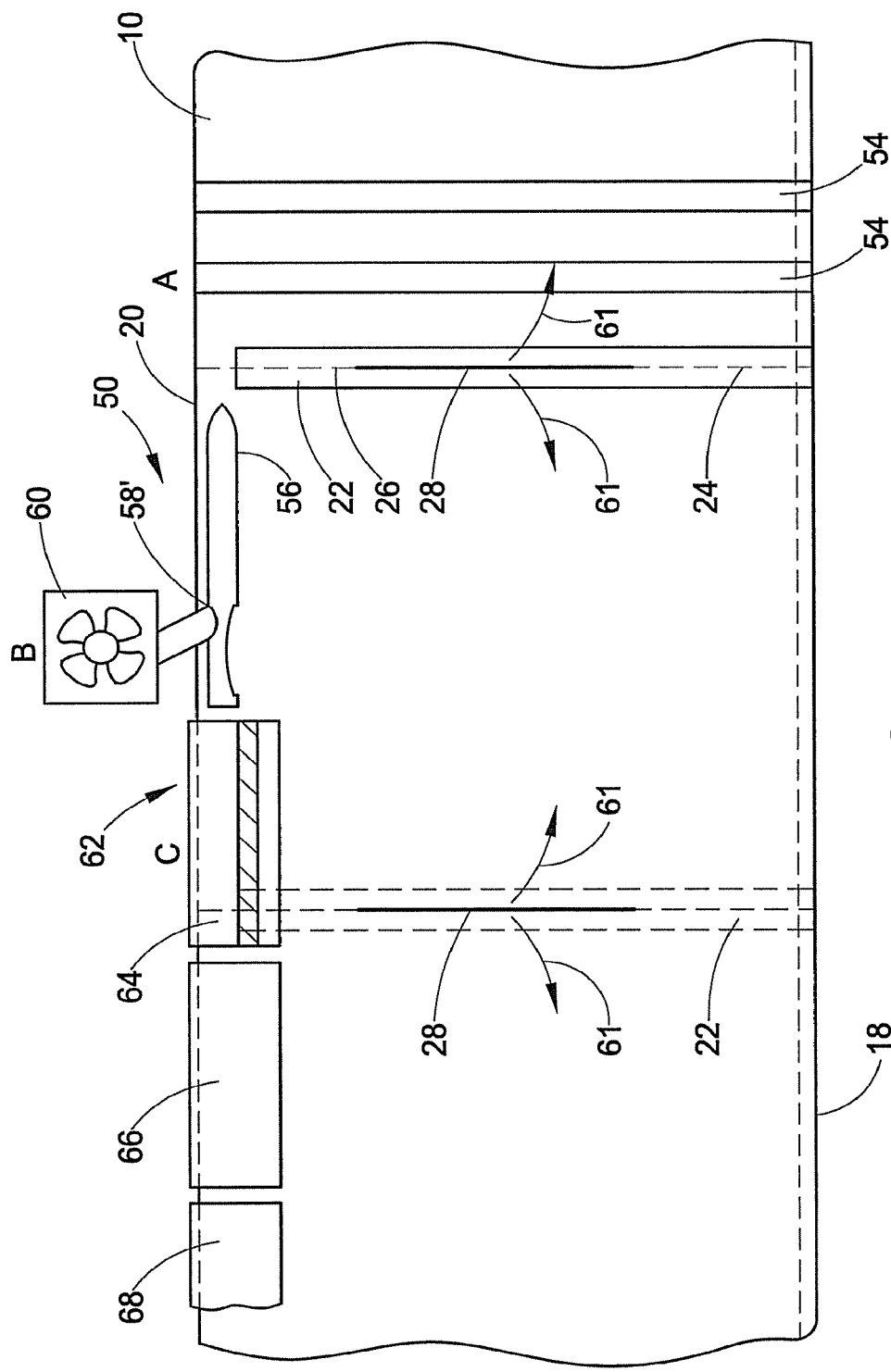
FIG. 7B schematically illustrates a plan view of a process and machine for converting web pouches to fluid filled units.

FIG. 6 illustrates a further embodiment of the web 10'''. In this embodiment, the gap forming area 28 comprises at least two elongated cuts 32, separated by light connections of plastic 36, also referred to as "ticks." These connections 36 hold transverse edges 38, 40 of the pouches 12 together to ease handling of the web 10, such as handling required during installation of the web 10 into a dunnage machine. As the pouches 12 are inflated, the connections 36 rupture or otherwise break resulting in a gap 13 between the spaced pairs of perforations 24, 26. This gap 13 allows for full inflation and reduces the stresses in the layers at the seal site normally caused by the foreshortening and restrictions on foreshortening of webs in the prior art. The reduced stress in the layers inhibits wrinkles along the inflation opening to be sealed.

Other methods of creating a gap forming area not specifically disclosed are with the scope of the present application. Any area that separates and forms a gap between adjacent pouches as pouches 12 in a web 10 are inflated are contemplated by this disclosure.

FIG. 3, illustrates a length of the web 10, 10', 10" or 10'" after it has been inflated and sealed to form dunnage units 12'. An inflation seal 42, the transverse seals 22 and an opposite edge seal 44 hermetically seal the top and bottom layers. The side edges 38, 40 of the formed dunnage units are separated to form a gap 13. Each pair of adjacent dunnage units 12' are connected together by the pair of spaced apart lines of perforations 24, 26. The gap 13 extends between the pair of spaced apart lines of perforations 24, 26. The array of dunnage units 12' is a single row of dunnage units in a "ladder" configuration. The lines of perforations 24, 26 are configured to be easily breakable by a worker or automated system. To separate a pair of adjacent units 12', a worker inserts an object, such as the worker's hand or hands into the gap 13. The worker then grasps one or both of the adjacent dunnage units 12' and pulls the adjacent dunnage units 12' relatively apart as indicated by arrows 43a, 43b. The lines of perforation 24, 26 rupture or otherwise separate and the two adjacent dunnage units 12' are separated. The existence of the gap 13 also results in reduced stresses in the area of the inflation seal 42 at the time of sealing and accommodates increased inflation volume of the dunnage units 12' as compared with prior inflated dunnage units.

In one embodiment, the line of perforations 24 that extends from the opposite edge 20 is omitted. In this embodiment, the gap forming area 28 extends from the inflation edge line of perforations 26 to the opposite edge. In this embodiment, the gap 13 extends from the inflation edge line of perforations 26 to the opposite edge 20.

The connection of the layers 14, 16 at the inflation edge 18 can be any connection that is maintained between layers 14, 16 prior to the web 10 being processed to create dunnage units 12'. In the embodiment illustrated by FIGS. 1 and 2A, the connection is a fold. In the embodiment illustrated by FIG. 2, the connection is a line of perforations 21. One method of producing such a web is to fold a continuous layer of plastic onto itself and create a fold at what is to become the inflation edge 18, A tool can be placed in contact with the fold to create a line of perforation. The opposite edge 20 can be hermetically sealed and the transverse hermetic seals 22 can be added along with the separated lines of perforations 24, 26 extending inward from the inflation and opposite edges 18, 20. The web shown in FIG. 1 can be produced in the same manner, except the perforations are not added.

FIGS. 7A, 7B, 8A, 8B and 9 schematically illustrate a machine 50 and process of converting the webs 10, 10', 10" and 10'" to dunnage units 12'. Referring to FIGS. 7A, 7B, 8A and 8B, a web 10, 10', 10" or 10'" is routed from a supply 52 (FIGS. 8A and 8B) to and around a pair of elongated, transversely extending guide rollers 54. The guide rollers 54 keep the web taught as the web 10 is pulled through the machine 50. At location A, the web pouches are uninflated. In the embodiment illustrated by FIG. 5, pouch edges 38, 40 defined by the cut 31 are close to one another at location A. In the embodiments illustrated by FIGS. 4 and 6, the frangible connections 29, 36 are of sufficient strength to remain intact at location A.

A longitudinally extending guide pin 56 is disposed in the web at station B. The guide pin 56 is disposed in a pocket bounded by the top and bottom layers 14, 16, the inflation edge 18, and ends of the transverse seals 22. The guide pin 56 aligns the web as it is pulled through the machine. A separator, such as a knife cutter 58 (FIGS. 7A and 8A), or a blunt surface 58' (FIGS. 7B and 8B) is present on the guide pin 56. In the embodiment illustrated by FIGS. 7A and 8A the knife cutter 58 extends from the guide pin 56. The knife cutter 58 is used to cut the inflation edge 18 illustrated by FIG. 1, but could also be used to cut the perforated inflation edge 18 illustrated by FIG. 2. The cutter 58 slits the inflation edge 18 as the web moves through the machine 50 to provide inflation openings 59 (See FIG. 9) into the pouches, while leaving the pouches otherwise imperforate. A variation of this would have the cutter 58 cutting either layer 14, 16, or both near the inflation edge 18. In the embodiment illustrated by FIGS. 7B and 8B, the guide pin 56 defines a separator in the form of the blunt surface 58' and the knife cutter is omitted. The blunt surface 58' is used to break the perforated inflation edge illustrated by FIG. 2. The blunt surface 58' breaks open the inflation edge 18 as the web moves through the machine to provide the inflation openings into the pouches 12.

Figure 9:
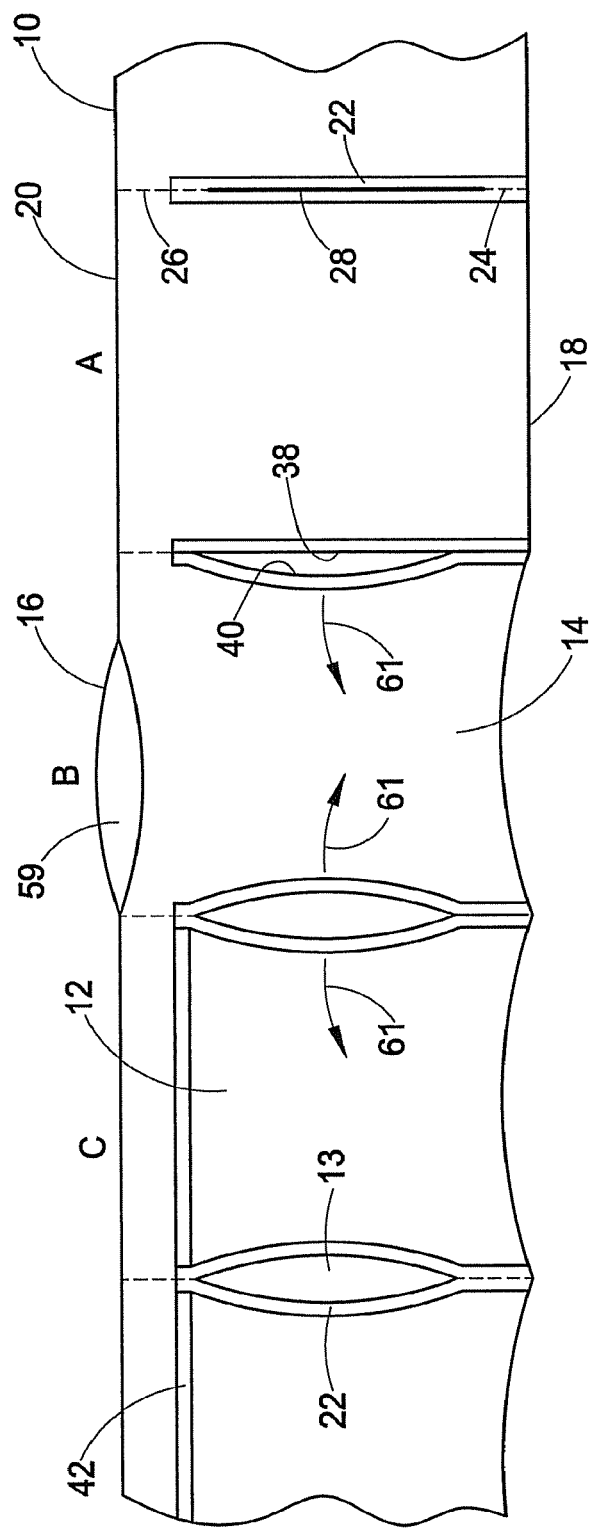
FIG. 9 illustrates a process for converting web pouches to fluid filled units.

A blower 60 is positioned after the cutter 58 or blunt surface 58' in station B. The blower 60 inflates the web pouches as the web moves past the blower. Referring to FIG. 9, the web pouches are opened and inflated at station B. The seal edges 38, 40 spread apart as indicated by arrows 61 (FIGS. 7A, 7B and 9) as the web pouches are inflated. In the embodiment illustrated by FIGS. 4 and 6, the frangible connections 29, 36 maintain successive pouches substantially aligned as the web is fed to the filling station B. The frangible connections are sufficiently weak that the connection between a pouch that has been opened for inflation and is being inflated at the fill station B and an adjacent, successive (or preceding) pouch will rupture as the pouch at the fill station is inflated. The spreading of the edges 38, 40 forms a row of inflated dunnage units in a ladder configuration and increases the volume of the air that can enter the pouches. The spreading also reduces the stresses imparted to the web adjacent the inflation side edge 18 where it is to be sealed.

The inflation seal 42 is formed at station C by a sealing assembly 62 to complete each dunnage unit. In the exemplary embodiment, the inflated volume of the pouches is maintained by continuing to blow air into the pouch until substantially the entire length of the inflation opening 59 is sealed. In the example of FIGS. 8A, 8B and 9, the blower 60 blows air into a pouch being sealed up to a location that is a short distance $D_1$ from closing position where the sealing assembly 62 pinches the top and bottom layers 14, 16 to maintain the inflated volume of the pouches. This distance $D_1$ is minimized to minimize the volume of air that escapes from the inflated pouch before the trailing transverse seal of the inflated pouch reaches the closing position. For example, the distance $D_1$ may be 0.250 inches or less, to blow air into the inflation opening unit the trailing transverse seal is within 0.250 inches of the closing position.

In the examples illustrated by FIGS. 8A and 8B, the sealing assembly includes a pair of heated sealing elements 64, a pair of cooling elements 66, a pair of drive rollers 68, and a pair of drive belts 70. In an alternate embodiment, the pair of cooling elements is omitted. Each belt 70 is disposed around its respective heat sealing element 64, cooling element 66 (if included), and drive roller 68. Each belt 70 is driven by its respective drive roller 68. The belts 70 are in close proximity or engage one another, such that the belts 70 pull the web 10 through the heat sealing elements 64 and the cooling elements 66. The seal 42 is formed as the web 10 passes through first the heated sealing elements 64 and then a heat sink such as the cooling elements. One suitable heating element 64 includes heating wire 80 carried by an insulating block 82. Resistance of the heating wire 80 causes the heating wire 80 to heat up when voltage is applied. The cooling elements 66 cool the seal 42 as the web 10 is pulled between the cooling elements. One suitable cooling element is an aluminum (or other heatsink material) block that transfers heat away from the seal 42. Referring to FIG. 9, the spreading of the edges 38, 40 greatly reduces the stress imparted on the web material at or near the seal 42. As a result, a much more reliable seal 42 is formed.

Figure 11:
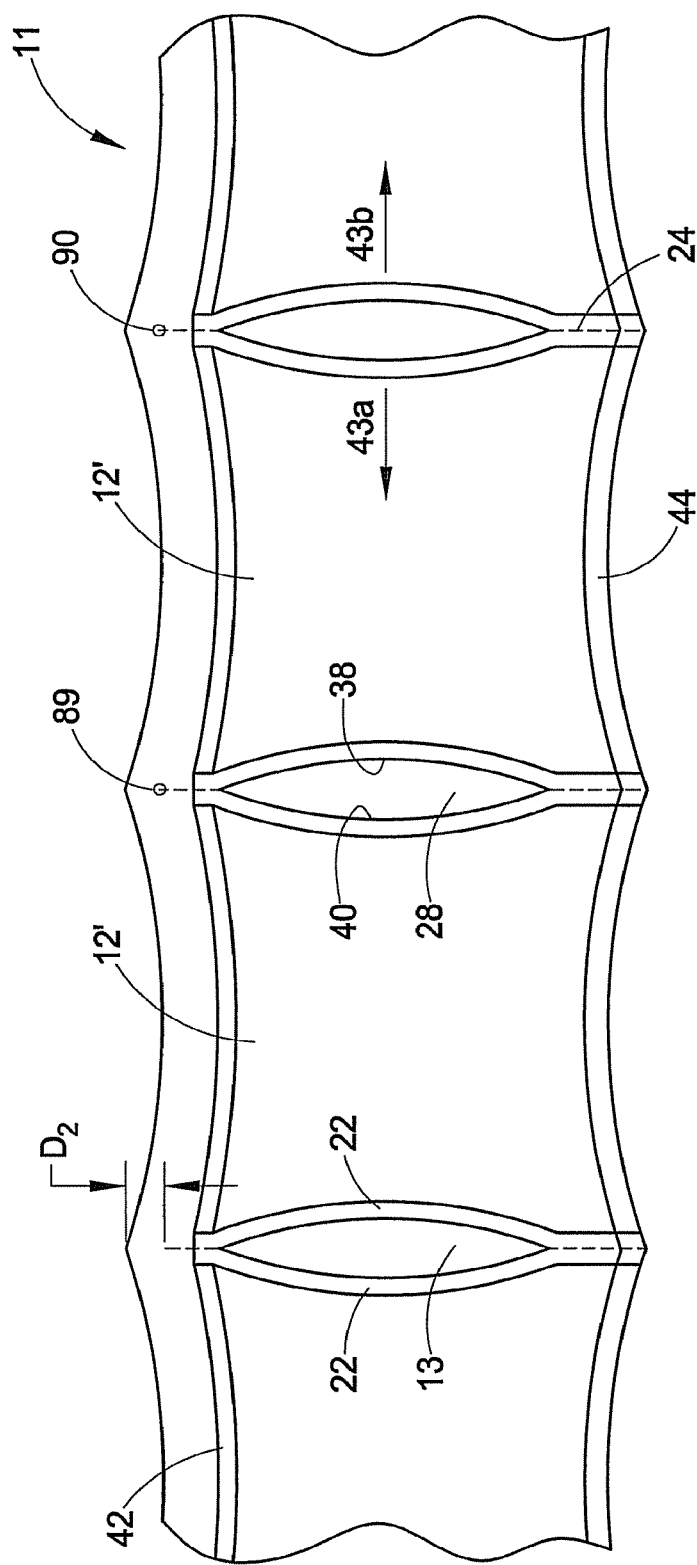
FIG. 11 illustrates a web of pouches inflated and sealed to form fluid filled units.
Figure 12:
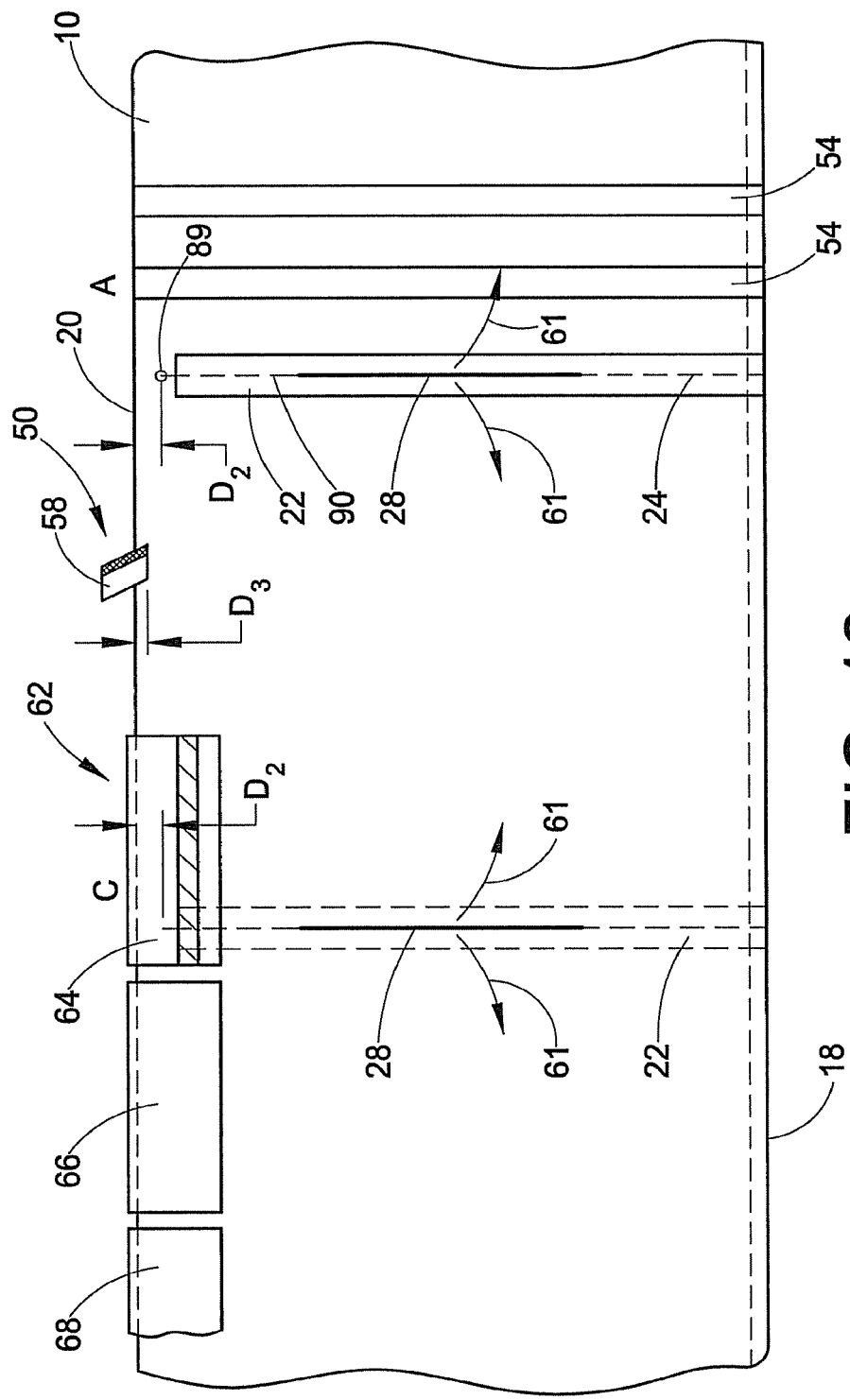
FIG. 12 schematically illustrates a plan view of a cutter for opening the inflation edge of a web.

FIGS. 10-12 show another embodiment of a web 10. In this embodiment, the spaced apart lines of perforations 26 extending from the inflation edge, as shown in FIGS. 1-7B and 9, is replaced with a modified line of perforations 90. As best seen in FIG. 10, a starting point 89 of the line of perforations 90 begins a distance $D_2$ from the inflation edge 18 and extends away from and generally perpendicular to the inflation edge 18. As can be seen in FIG. 10A, in an embodiment in which a frangible connection 21' (also shown in FIG. 2A) is offset from the inflation edge 18 by a distance $D_4$, the distance $D_2$ is greater than the distance $D_4$. Hence, in the examples illustrated by FIGS. 10-12, the line of perforations 90 extends to a gap forming area 28 and an opposite edge line of perforations 24 extends to the opposite edge. In another embodiment, the gap forming area 28 is not included and the line of perforations 90 extends all the way or nearly all the way to the opposite edge.

The distance $D_2$ is selected to prevent the cutter (FIG. 12) from engaging the line of perforations in the exemplary embodiment. Although distance $D_2$ may vary based on the particular cutter implemented, in one embodiment, distance $D_2$ is approximately 0.25 to 0.375 inch in length. FIG. 11 illustrates a row of inflated dunnage units. The elimination of perforations extending to the inflation edge 18 does not make it substantially harder to separate adjacent dunnage units in the row 11 of dunnage units 12' in the exemplary embodiment. The dunnage units 12' can still be separated by inserting an object or objects, such as a hand or hands, into the gap 13 and pulling one dunnage unit 12' away from an adjacent dunnage unit 12'. When the dunnage units are pulled apart, the thin web of material between the starting point 89 and the inflation edge easily breaks.

The process of forming perforations through the top and bottom layers of plastic 14, 16, as the web 10 is formed, may cause the top and bottom layers 14, 16 to be adhere or be held together at the line of a perforations. When the lines of perforations extend all the way to the inflation edge and the cutter 58 cuts on one side of the inflation edge, the cutter will engage each line of perforations. Engagement of the lines of perforations by the cutter may cause the web to bind, wrinkle, bunch up, or gather around the edge of the cutter until the cutter passes the line of perforations and begins cutting the web again. In the embodiment illustrated by FIGS. 10-12, engagement of the line of perforations 90 with the cutter is eliminated by beginning the line of perforations 90 a distance $D_2$ away from the inflation edge 20. As illustrated in FIG. 12, the tip of a cutter 58 utilized in opening the inflation edge 20 is positioned a distance $D_3$ past the inflation edge 20 as the edge is opened. The distance $D_2$ that the line of perforations 90 is away from the inflation edge 20 is configured to be greater that the distance $D_3$ to which the tip of a cutter 58 is positioned past the inflation edge 20. As a result, the cutter 58 will not engage the lines of perforations. Likewise, in the case of the frangible connection 21' shown in 10A, the cutter 58 or blunt surface 58' (FIG. 7B) that opens the offset frangible connection 21' will not engage the lines of perforations 90. This eliminates the possibility that the cutter or blunt surface could engage the lines of perforations and cause the web to bunch up or gather around the cutter 58 or blunt surface 58' as the cutter 58 opens the inflation edge.

Figure 13:
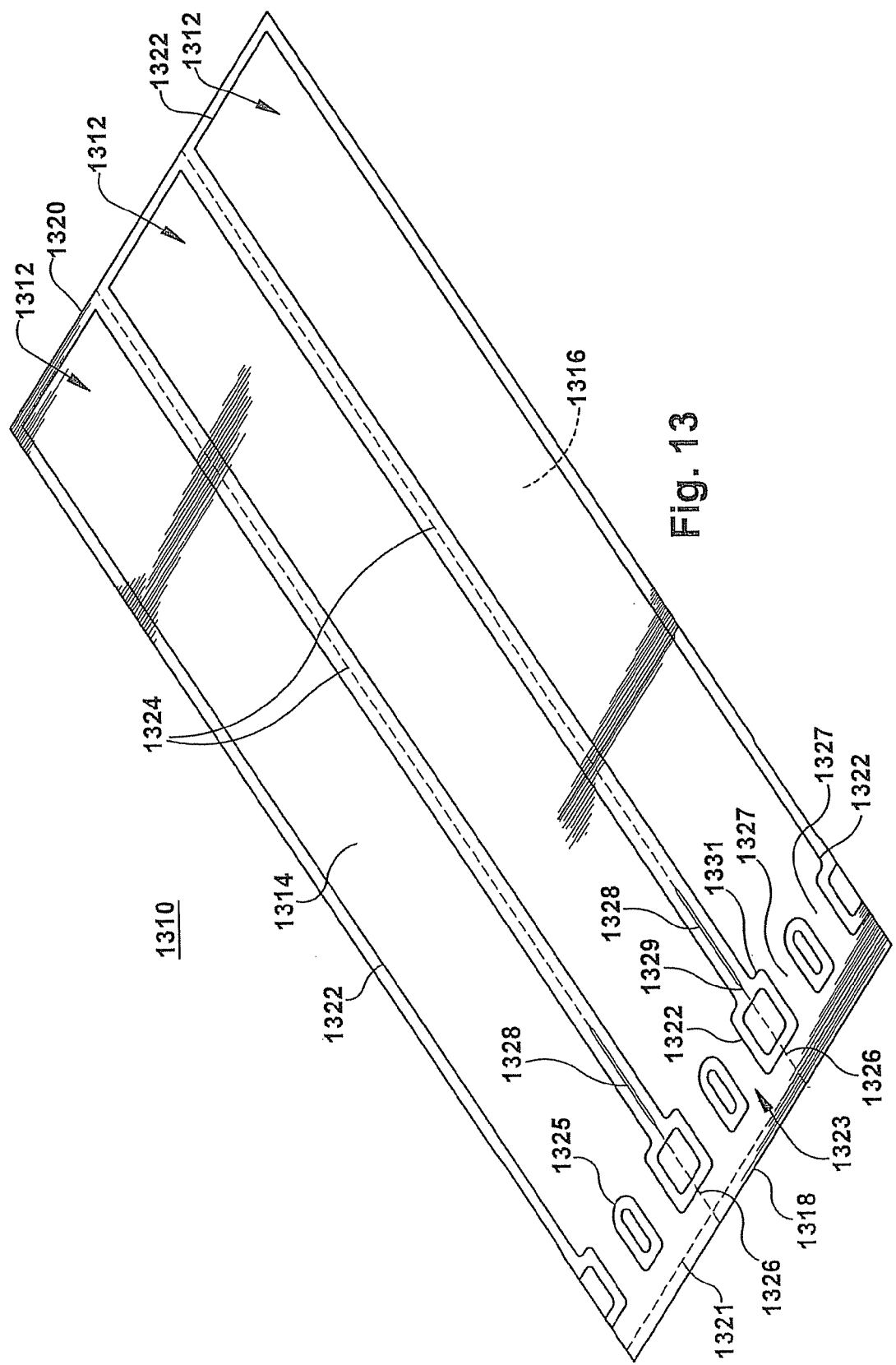
FIG. 13 is a perspective view of another embodiment of a web for making fluid filled units.
Figure 14:
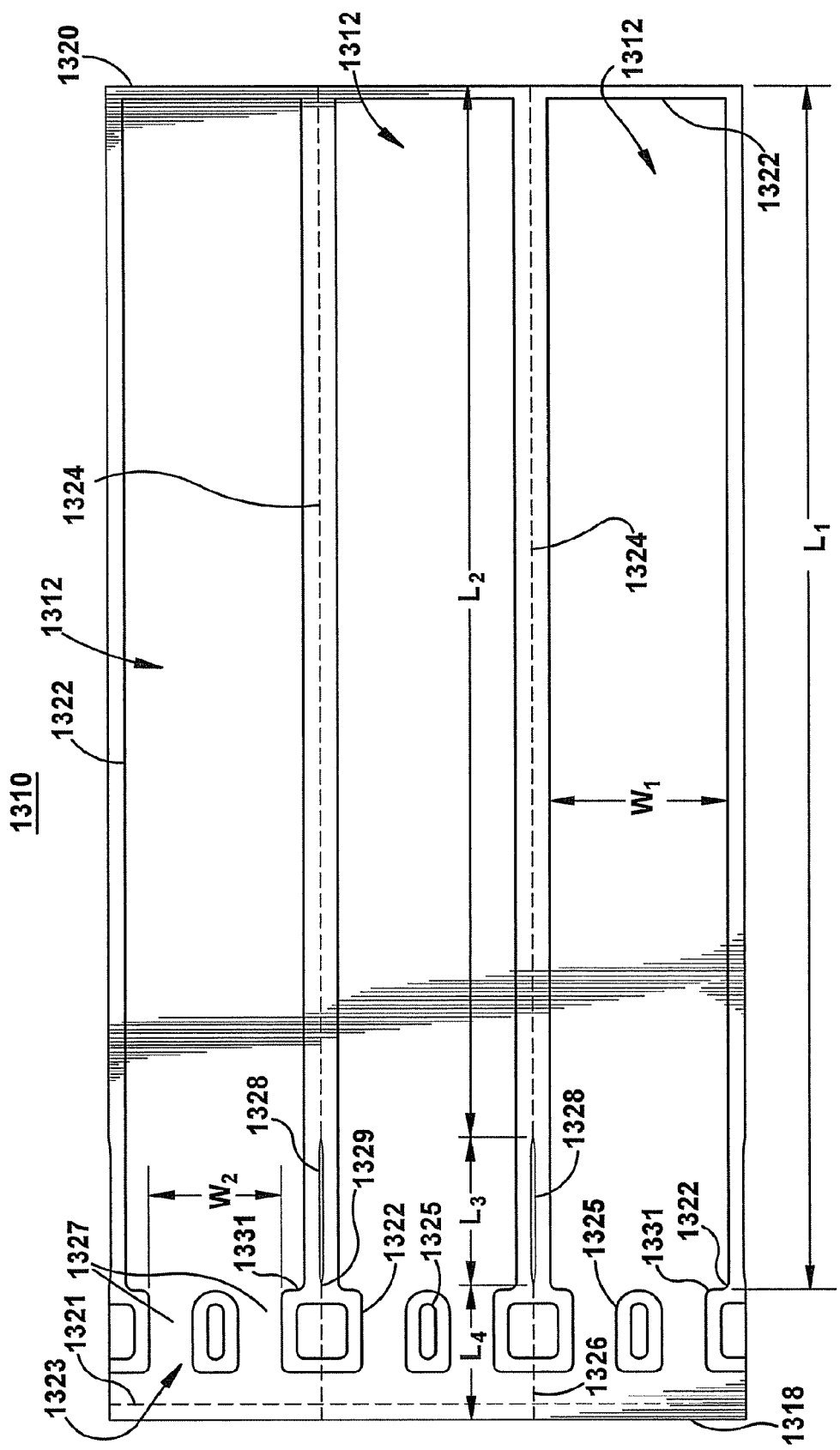
FIG. 14 is a top view of the web shown in FIG. 13.

FIGS. 13 and 14 illustrate another embodiment of a web 1310 of inflatable pouches 1312. Any of the features of the webs illustrated in FIGS. 1, 2, 4-6, and 10-12 can be incorporated into the web 1310 or replace features of the web 1310 described below. Further, any of the features of the web 1310 can be incorporated into the webs illustrated in FIGS. 1, 2, 4-6, and 10-12 or replace features of the webs described in FIGS. 1, 2, 4-6, and 10-12. The web 1310 includes a top elongated layer of plastic 1314 superposed onto a bottom layer of plastic 1316. The layers are connected together along spaced edges, referred to as the inflation edge or side 1318 and the opposite edge or side 1320.

In the example illustrated by FIG. 13, an optional frangible connection 1321 is spaced apart from the inflation edge 1318. The illustrated frangible connection 1321 is a line of perforations. The frangible connection 1321 is present in one of the superposed layers, at a location offset from the inflation edge 1318 by a distance. This distance may be between 0.075 and 0.25 inches, in an exemplary embodiment between 0.09375 and 0.15625 inches, for example 0.13 inches.

Referring to FIGS. 13 and 14, a plurality of seals 1322 join the top and bottom layers 1314, 1316 to define pouches 1312. The seals 1322 may take a wide variety of different configurations. In the example illustrated by FIGS. 13 and 14, the seals 1322 define an elongated tube having a length $L_1$ and a width $W_1$ (see FIG. 14). The seals 1322 further define a mouth 1323 of the elongated tube having a width $W_2$ that is narrower than the width $W_1$ of the elongated tube.

In the embodiment illustrated by FIGS. 13 and 14, optional mouth dividing seals 1325 divide the mouth 1323 into multiple ports 1327 and reduce the area of the mouth through which air can pass. This reduction of the area through which air can pass, reduces the amount of an air which escapes as the pouch is sealed. The dividing seals 1325 can take any form and can define any number of inflation ports 1327.

Spaced pairs of lines of perforations 1324, 1326 extend through the top and bottom layers. A gap forming area 1328 extends between each associated pair of lines of perforations 1324, 1326. In the embodiment illustrated by FIGS. 13 and 14, the inflation side line of perforations 1326, the gap forming area 1328, and the opposite side line of perforations 1324 are arranged in an in-line, end to end configuration between adjacent pairs of the pouches 12.

Figure 15:
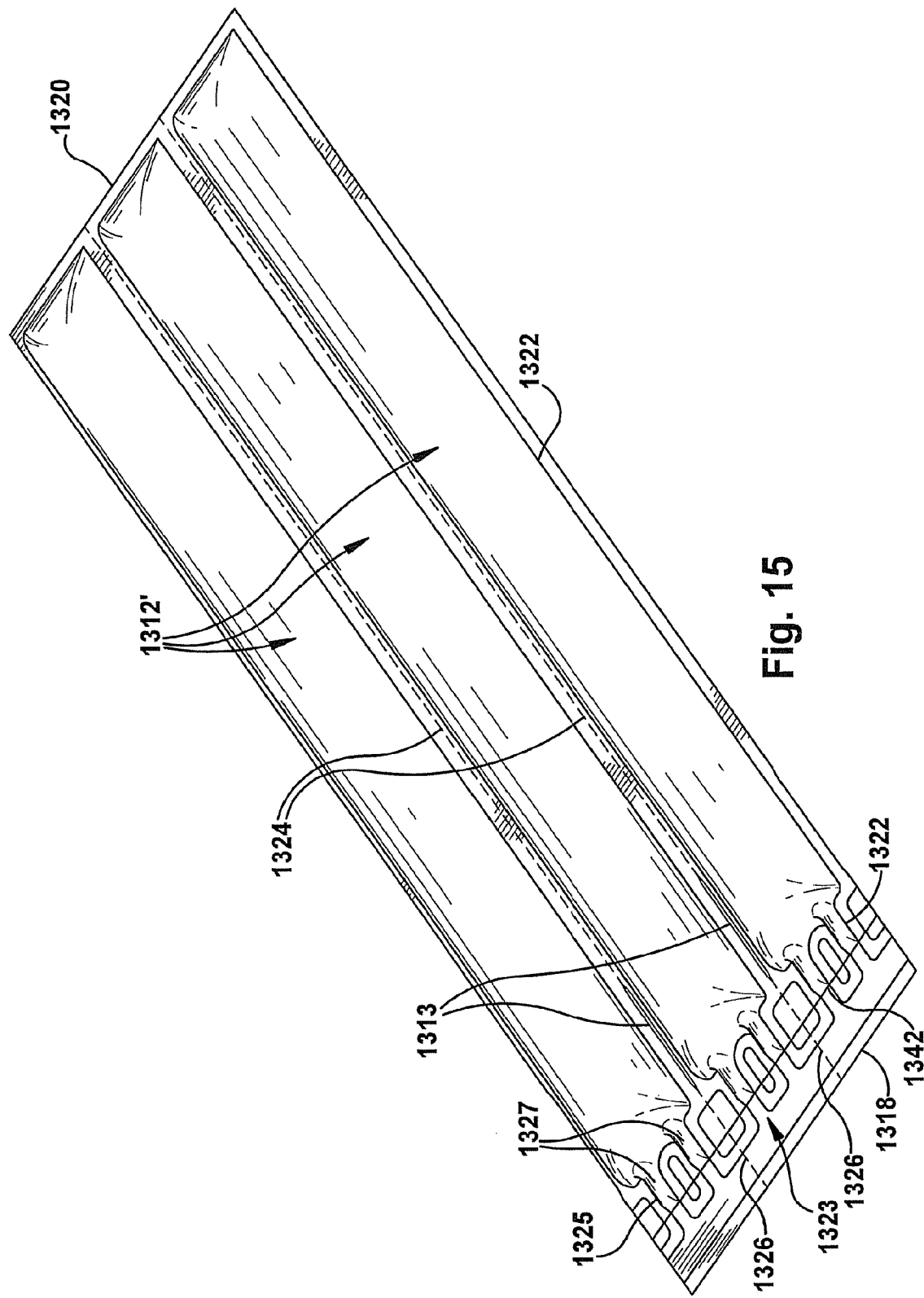
FIG. 15 is a perspective view of the web of FIG. 13 with pouches inflated and sealed to form fluid filled units.

Referring to FIGS. 15-17, the gap forming area 1328 opens to form a gap 1313 when the pouches are inflated. In the embodiment illustrated by FIGS. 13 and 14, at least one of the lines of perforations 1324, 1326 are significantly longer than the gap forming area 1328. For example, the line of perforations 1324 and/or the line of perforations 1326 may be at least three times as long as the gap forming area 1328. In one embodiment, a length $L_2$ of the line of perforations 1324 is three to ten times as long a length $L_3$ of the gap forming area and a length $L_4$ of the line of perforations 1326 is the same length or shorter than the length $L_3$ of the gap forming area 1328.

The gap forming area 1328 may be positioned and sized to allow better inflation of the pouch 1312 and give the user a hole to start to tear with. In the embodiment illustrated by FIGS. 13-17, a start or beginning 1329 of the gap forming area 1328 is aligned or substantially aligned with a transition 1331 of the tube from the mouth (having width $W_2$) to the elongated tube portion (having width $W_1$). The length $L_3$ of the gap forming area may be selected for the particular application of the pouches 1312. In one embodiment, the length $L_3$ of the gap forming area may be between one and four inches, for example the length $L_3$ may be about 1.8 inches.

As described above, a gap forming area 1328 denotes an area, preferably linear in shape, that will rupture or otherwise separate when exposed to a predetermined inflation force. The magnitude of the inflation force is less than the magnitude of the force needed to rupture or separate the spaced apart lines of perforations 1324. The gap forming area 1328 can take a variety of different forms, as discussed above. Any method that produces an area between the spaced apart lines of perforations 1324, 1326 that ruptures or otherwise separates at a force lower than a force needed t rupture or separate spaced lines of perforations 1324, 1326 may be employed to make the gap forming area 28.

Referring to FIGS. 13-14, prior to conversion to a dunnage unit, a pouch 1312 is typically hermetically sealed on three sides, leaving the mouth 1323 open to allow for inflation. Once the pouch is inflated, the mouth 1323 is hermetically sealed and the dunnage unit 1312' is formed as described above.

In the embodiment illustrated by FIGS. 13-17, the gap forming area 1328, produces a gap 1313 between adjacent pouches upon inflation. The gap allows foreshortening of the connected pouch sides in the area of the mouth 1323 and thereby reduces the undesirable stresses that are introduced during inflation. The gap 1313 maintains the inflation opening substantially free of wrinkles as the inflation opening is sealed to convert the inflated pouches to a dunnage units.

The illustrated web 1310 is constructed from a heat sealable plastic film, such as polyethylene. The web 1310 is designed to accommodate a process for inflating each pouch 1312 in the web to create a row or ladder 1311 of dunnage units 1312. The gap forming area 1328 creates a gap 1313 between dunnage units 1312, which facilitate a efficient and effective process for separating adjacent dunnage units 1312 in the row or ladder 1311. The gap forming area 1328 may be an easily breakable line of perforations, an elongated cut through both layers of material, or separated by light connections of plastic, also referred to as "ticks" as described above.

FIGS. 15-17 illustrate a length of the web 1310 after it has been inflated and sealed to form dunnage units 1312'. An inflation seal 1342 seals the pouches 1312 shut. Each pair of adjacent dunnage units 1312' are connected together by the pair of spaced apart lines of perforations 1324, 1326. The spaced apart lines of perforations 1324, 1326 are spaced apart by the gap 1313.

A single row 1311 of dunnage units 1312' can be graphically described as being in a "ladder" configuration. This configuration makes separating two adjacent dunnage units 1312' easy. To separate a pair of adjacent dunnage units 1312', a worker simply inserts an object or objects, such as a hand, hands, finger and/or fingers, into the gap 1313 and pulls one dunnage unit 1312' away from the other dunnage unit 1312'. In the alternative, a mechanical system can be used to separate dunnage units 1312'. A machine can be configured to insert an object between adjacent dunnage units 1312' and apply a force to separate the units. The existence of the gap 1313 also results in reduced stresses in the area of the inflation seal 1324, 1326 at the time of sealing and accommodates increased inflation volume of the dunnage units 1312'.

The web 1310 can be converted to dunnage units 1312' using the machine 50 and process schematically illustrated by FIGS. 7A, 7B, 8A, 8B and 9 and as described with respect to the webs 10, 10', 10" and 10"". However, the web 1310 can be converted to dunnage units 1312 in any manner. When the web 1310 includes the line of perforations 1321, this line of perforations 1321 will be broken as the machine 50 converts the web 1310 to dunnage units 1312'.

The present invention is not to be considered limited to the precise construction disclosed. Various modifications, adaptations and uses may occur to those skilled in the art to which the invention relates. All such modifications, adaptations, and uses fall within the scope or spirit of the claims.

The invention claimed is:

1. A web for forming dunnage units, comprising:
   a first elongated layer;
   a second elongated layer superposed over the first elongated layer;
   a plurality of seals that hermetically join the first elongated layer to the second elongated layer to form a plurality of inflatable pouches and an inflation channel that is in fluid communication with the pouches and is disposed outside of the pouches;
   an inflation side line of perforations through the first and second layers, between at least one pair of adjacent pouches;
   a gap forming area defined in the first and second layers between at least one pair of adjacent pouches, the gap forming area comprising a cut that is longer than any other perforation of the web;
   an opposite side line of perforations through the first and second layers, between at least one pair of adjacent pouches;
   wherein the inflation side line of perforations, the cut, and the opposite side line of perforations are arranged in a line;
   wherein the inflation side line of perforations has a length that extends from the inflation channel to the cut, and the cut has a length that extends from the inflation side line of perforations to the opposite side line of perforations; and
   wherein a length of the opposite side line of perforations is at least three times as long as the cut.

2. The web of claim 1, wherein the length of the inflation side line of perforations is not greater than the length of the gap forming area.

3. The web of claim 1, wherein the pouches include a mouth portion and an elongated tube portion, wherein the elongated tube portion is wider than the mouth portion.

4. The web of claim 3, wherein an end of the cut is aligned with a transition from the mouth portion to the elongated tube portion of the pouch.

5. The web of claim 1, wherein the length of the opposite side line of perforations is between three times and ten times as long as a length of the cut.

6. The web of claim 1, wherein the mouth is divided into multiple ports.

7. A web for forming dunnage units, comprising:
   a first elongated layer;
   a second elongated layer superposed over the first elongated layer;
   a plurality of seals that hermetically join the first elongated layer to the second elongated layer to form a plurality of inflatable pouches and an inflation channel that is in fluid communication with the pouches and is disposed outside of the pouches;

wherein the pouches include a mouth portion and an elongated tube portion;

wherein the elongated tube portion is wider than the mouth portion;

an inflation side line of perforations through the first and second layers between at least one pair of adjacent pouches;

a gap forming area defined in the first and second layers between at least one pair of adjacent pouches, the gap forming area comprising a cut that is longer than any other perforation of the web; and an opposite side line of perforations through the first and second layers between at least one pair of adjacent pouches;

wherein the inflation side line of perforations, the cut, and the opposite side line of perforations are arranged in a line;

wherein the inflation side line of perforations has a length that extends from the inflation channel to the cut, and the cut has a length that extends from the inflation side line of perforations to the opposite side line of perforations; and wherein an end of the cut is aligned with a transition from the mouth portion to the elongated tube portion of the pouch.

8. The web of claim 7, wherein a length of the opposite side line of perforations is at least three times as long as a length of the cut.

9. The web of claim 7, wherein the length of the inflation side line of perforations is not greater than the length of the cut.

10. The web of claim 7, wherein the length of the opposite side line of perforations is between three times and ten times as long as a length of the cut.

11. The web of claim 7, wherein the mouth portion is divided into multiple ports.

12. A web for forming dunnage units, comprising:

a first elongated layer;

a second elongated layer superposed over the first elongated layer;

a plurality of seals that hermetically join the first elongated layer to the second elongated layer to form a plurality of inflatable pouches and an inflation channel that is in fluid communication with the pouches and is disposed outside of the pouches;

wherein the pouches include a mouth portion and an elongated tube portion;

wherein the elongated tube portion is wider than the mouth portion;

an inflation side line of perforations through the first and second layers between at least one pair of adjacent pouches;

a gap forming cut defined in the first and second layers between at least one pair of adjacent pouches, wherein the gap forming cut is longer than any other perforation of the web;

an opposite side line of perforations through the first and second layers between at least one pair of adjacent pouches;

wherein the inflation side line of perforations, the gap forming cut, and the opposite side line of perforations are arranged in a line;

wherein the inflation side line of perforations has a length that extends from the inflation channel to the gap forming cut, and the gap forming cut has a length that extends from the inflation side line of perforations to the opposite side line of perforations;

wherein an end of the gap forming cut is aligned with a transition from the mouth portion to the elongated tube portion of the pouch;

wherein a length of the opposite side line of perforations is at least three times as long as a length of the gap forming cut; and wherein the length of the inflation side line of perforations is less than or equal to the length of the gap forming cut.

* * * * *